United States Patent
Ger et al.

(10) Patent No.: US 9,142,376 B2
(45) Date of Patent: Sep. 22, 2015

(54) METHOD FOR FABRICATING FIELD EMISSION CATHODE, FIELD EMISSION CATHODE THEREOF, AND FIELD EMISSION LIGHTING SOURCE USING THE SAME

(71) Applicant: National Defense University, Bade (TW)

(72) Inventors: Ming-Der Ger, Bade (TW); Nen-Wen Pu, Taoyuan County (TW); Yih-Ming Liu, Zhongli (TW); Kun-Ju Chung, Pingtung County (TW)

(73) Assignee: NATIONAL DEFENSE UNIVERSITY, Bade (TW)

( * ) Notice: Subject to any disclaimer, the term of this patent is extended or adjusted under 35 U.S.C. 154(b) by 253 days.

(21) Appl. No.: 13/847,884

(22) Filed: Mar. 20, 2013

(65) Prior Publication Data

US 2014/0055027 A1 Feb. 27, 2014

(30) Foreign Application Priority Data

Aug. 22, 2012 (TW) .............................. 101130516 A

(51) Int. Cl.
*H01J 1/304* (2006.01)
*H01J 9/02* (2006.01)
*H01J 63/02* (2006.01)
(Continued)

(52) U.S. Cl.
CPC ................. *H01J 1/304* (2013.01); *H01J 9/025* (2013.01); *H01J 63/02* (2013.01); *H01J 63/06* (2013.01); *B82Y 40/00* (2013.01); *B82Y 99/00* (2013.01); *H01J 2201/3043* (2013.01); *H01J 2201/30434* (2013.01); *H01J 2201/30469* (2013.01); *Y10S 977/939* (2013.01)

(58) Field of Classification Search
None
See application file for complete search history.

(56) References Cited

U.S. PATENT DOCUMENTS 6,333,016 B1 12/2001 Resasco et al.
6,948,995 B2 9/2005 Ishikura et al.
(Continued)

FOREIGN PATENT DOCUMENTS

JP 2005-166690 6/2005
JP 2008-254757 10/2008
(Continued)

OTHER PUBLICATIONS

Bonard, Jean-Marc et al., Field emission from cylindrical carbon nanotube cathodes. Possibilities for luminescent tube, Applied Physics Letters, 2001, pp. 2775-2777.
(Continued)

*Primary Examiner* — Britt D Hanley
(74) *Attorney, Agent, or Firm* — Muncy, Geissler, Olds & Lowe, P.C.

(57) ABSTRACT

A method for fabricating field emission cathode, a field emission cathode, and a field emission lighting source are provided. The method includes: forming a catalyst crystallite nucleus layer on the surface of cathode substrate by self-assembly of a noble metal catalyst, growing a composited nano carbon material on the cathode substrate by using a TCVD process, in which the composited nano carbon material includes coil carbon nano tubes and coil carbon nano fibers. The measured quantity of total coil carbon nano tubes and coil carbon nano fibers is higher than 40%. The field emission cathode is fabricated by the aforementioned method, and the field emission lighting source includes the aforementioned field emission cathode.

10 Claims, 22 Drawing Sheets

(51) Int. Cl.
*H01J 63/06* (2006.01)
*B82Y 99/00* (2011.01)
*B82Y 40/00* (2011.01)

(56) References Cited

U.S. PATENT DOCUMENTS

| | | | |
|---|---|---|---|
| 6,975,063 B2 | 12/2005 | Mao et al. | |
| 7,098,112 B2 | 8/2006 | Jung et al. | |
| 7,276,843 B2 | 10/2007 | Sasaguri et al. | |
| 7,396,798 B2 | 7/2008 | Ma et al. | |
| 7,923,403 B2 | 4/2011 | Ma et al. | |
| 7,960,904 B2 | 6/2011 | Takai et al. | |
| 7,968,489 B2 | 6/2011 | Ma et al. | |
| 8,044,581 B2 | 10/2011 | Park et al. | |
| 2002/0090468 A1 | 7/2002 | Goto et al. | |
| 2003/0001477 A1 | 1/2003 | Sasaguri | |
| 2003/0109382 A1* | 6/2003 | Nakayama et al. | 502/336 |
| 2004/0060477 A1* | 4/2004 | Iwaki et al. | 106/472 |
| 2005/0023950 A1 | 2/2005 | Yoon et al. | |
| 2006/0142148 A1 | 6/2006 | Ma et al. | |
| 2011/0014368 A1 | 1/2011 | Vasenkov | |

FOREIGN PATENT DOCUMENTS

| | | |
|---|---|---|
| TW | I274789 | 3/2007 |
| TW | 200743677 | 12/2007 |
| TW | 201001476 | 1/2010 |
| TW | I318963 (B) | 1/2010 |
| TW | I321806 | 3/2010 |
| TW | 201012964 | 4/2010 |
| TW | 201014787 | 4/2010 |
| TW | I324616 (B) | 5/2010 |
| TW | 201025415 | 7/2010 |

OTHER PUBLICATIONS

Bonard, J.-M. et al., Field emission properties of carbon nanohorn films, Journal of Applied Physics, 2002, pp. 10107-10109.

Fu, Weiqi et al., Spherical field emission cathode based on carbon nanotube paste and its application in luminescent bulbs, Journal of Vacuum Science and Technology B, 2008, pp. 1404-1406.

Huang, J.X. et al., Field-emission fluorescent lamp using carbon nanotubes on a wire-type cold cathode and a reflecting anode, Journal of Vacuum Science and Technology B, 2008, pp. 1700-1704.

Liu, Yih-Ming et al., Low temperature fabrication of Ni-P metallic patterns on ITO substrates utilizing inkjet printing, Microelectronics Reliability, 2012, pp. 398-404.

Sung, Woo Yong et al., Synthesis and field emission characteristics of carbon nanocoils with a high aspect ratio supported by copper microtips, Nanotechnology, 2007, pp. 1-5.

Pan, Lujun et al., Fabrication of Carbon Nanocoil Field Emitters and Their Application to Display, J. Soc. Photogr. Sci. Technol. Japan, 2002, pp. 369-372.

* cited by examiner

METHOD FOR FABRICATING FIELD EMISSION CATHODE, FIELD EMISSION CATHODE THEREOF, AND FIELD EMISSION LIGHTING SOURCE USING THE SAME

CROSS-REFERENCE TO RELATED APPLICATION

This application claims the benefit of Taiwan Patent Application No. 101130516, filed on Aug. 22, 2012, in the Taiwan Intellectual Property Office, the disclosure of which is incorporated herein in its entirety by reference.

FIELD OF THE INVENTION

The present invention relates to a method for fabricating field emission cathode, a field emission cathode thereof, and a field emission lighting source using the same, particularly to a method for fabricating field emission cathode, which utilizes a noble metal catalyst for growing a composited nano carbon material, and more particularly packing the field emission cathode and a field emission anode having a phosphor layer in a light-transmissive vacuum envelope in order to assembly a field emission lighting source.

BACKGROUND OF THE INVENTION

A theory of field emission was first discovered by R. H. Fowler and L. W. Nordheim in 1928; by applying a strong electric field between a field emission cathode and a field emission anode, the electrons might be able to directly tunnel through a potential barrier from the field emission cathode and to collided to the field emission anode. Based on this theory, in practice, the field emission cathode can be constituted by using outgrowing spike structures in the past, or carbon nano tubes (CNT) or nano zinc oxide materials nowadays. These structures or materials being used nowadays have better aspect ratio, thereby generating greater field emission enhancing factors for enhancing field emission.

Carbon nano tubes are single or multiple layered nano scaled graphite sheets forming a hollow cylindrical structure. Because of the small diameter and the large depth-to-width ratio of the carbon nano tube, hundreds to thousands times of locally enhanced electric field can be generated at the tip of the carbon nano tube, so that electrons can be emitted with an electric field of 1~2 V/μm from the CNT by overcoming a work function of 4.5 eV, which offers an excellent electron-emitting effect and can be applied to field emission lighting components in the field of light emitting. When the carbon nano tube is disposed at the cathode of an electric field, electrons can be driven to emit from the tip of CNT by the driving force of the electric field. Those electrons will be collided with phosphors layer on the anode through a vacuum interval, thereby a light beam is emitted from the phosphor layer based on the field emission light theory. The field emission light theory is applied for developing field emission light (FEL), and field emission display (FED). For instance, in 2002, J.-M. Bollard, R. Gaal, S. Garaj et al. had published a paper (Field emission properties of carbon nanohorn films; Journal of applied physics 91 (12): 10107-10109), which illustrates that carbon nanostructure, multi-single-wall carbon nano tube, and carbon nano cone have great field emission properties. In addition, US Pub. No. 20030001477, U.S. Pat. No. 7,276,843, and a paper published by Pan L, Hayashida T, Nakayama Y et al. in 2002 (Fabrication of Carbon Nanocoil Field-Emitters and Their Application to Display; Japan Hardcopy Vol 2002, page 533-534, 2002) also illustrate that single-wall carbon nano tube, cylindrical graphene, graphitic nano fibers, carbon nano-coil fiber can be used as a cathode emitter.

Field emission is driven by electrical energy to emit light; nowadays, field emission lighting sources are gradually sprout in the field of lighting. Referring to FIG. 1, a field emission cathode 95 is disposed in a vacuum glass tube 92 of a field emission lighting source 91, a electric field is formed while applying a electrical potential to the field emission light source 91, so that a light can be generated by colliding an electron beam emitted from the field emission cathode 95 with a phosphor layer 941, where the luminous efficiency thereof ranges from 40 to 60 lumens per watt. By using this kind of field emission light source having simple structure and having none energy consuming during semiconductor manufacture, the luminance environment in human society may be significantly improved.

The major component in the field emission lighting source is the field emission cathode; in numerous prior arts, processes for fabricating carbon nano tubes being used in the field emission cathode have been provided, such as the chemical vapor deposition (CVD) method provided by J-Ean-Bonard and Thomas stockli et al. in 2001 (Appl. Phys. Lett. 78, 2775), in which a metal filament made of Kanthal (Fe—Al—Cr alloy) was used as a substrate and was immersed in a catalyst of $Fe(No_3)_3 9H_2O$, and then the substrate was disposed in a reacting furnace with a temperature of 720° C. and acetylene and nitrogen gas were introduced thereinto. By using the CVD method, carbon nano tubes were then being grown on the surface of the metal filament, and forms a field emission cathode filament; while this field emission cathode filament is combined to an anode fluorescence tube, a field emission lighting source can be formed. This process for fabricating CNT directly by using CVD, however, needs to be processed in a high temperature environment, and those instruments used in this process are expensive. Additionally, using this process to mass produce the field emission lighting source is quite difficult and is not cost-effective. Moreover, the carbon nano tube is linear-shaped, electrons can only be emitted from the tip end thereof, and the emitting area is then limited accompanying with the melting of the carbon nano tube, so that the luminous quantity is low, thereby limiting the range of its applications.

Other processes each including a step of depositing a conductive layer on the substrate for growing CNT were also provided and disclosed under patents or publications, such as U.S. Pat. No. 6,948,995, TW Pat. No. I321806, or a paper published by Woo Yong Sung et al. in 2007 (Nanotechnology 18 245603) where CNT was grown on an electrical conductive thin layer on a nickel metal substrate. In addition, in 2008, Weiqi Fu, Liang Liu et al. had also provided a process (J. Vac. Sci. Technol. B, vol. 26, 1404), in which a stainless steel sphere was applied to be as a substrate, and this substrate was first coated with a silver paste. Then, a slurry containing carbon nano tube combined with organics which is like ethyl cellulose, terpineol, and diethyl ophthalate, etc. were coated on the surface of the substrate followed by a baking step. Next, the substrate was fixed on an inner center of an anode fluorescence sphere in order to form a field emission lighting bulb. Moreover, in TW Pat. No. I318963, another process was disclosed, in which a carbon nano tube array and prepolymer of polymethyl methacrylate thin layer was disposed on a substrate for fabricating materials of field emission cathode. In JP2005-166690, U.S. Pat. No. 7,960,904, an electrical conductive paste was plated on a field emission cathode lamp filament for adhering with carbon nano tube. Nevertheless, while using these processes, the requirement of an amount of organic materials like diethyl opthalate, polymethyl methacrylate is great such that organics will remain. Therefore, while fabricating the field emission lighting source, the organics will gradually leak during vacuum packaging and ion bombard, thus influencing the working life and the service luminous efficiency of the field emission lighting source.

In still another process disclosed under prior arts is to form composited plated layer by whether electroplating or chemical plating, such as in U.S. Pat. No. 6,975,063, Mao et al. disclosed an electroless plating manner, in which a carbon nano tube and a reduced metal were co-deposited on the surface of a substrate, and then the composited plated layer of carbon nano tube and metal can be obtained, and therefore the adhesion between the substrate and the carbon nano tube can be improved. However, in this manner, a traditional composited plating process was used, the plating solution thereof is easy to decompose and is hard to be storage. Plus, the emission efficiency and the luminance uniformity of the field emission lighting source merely using the carbon nano tube for field emission was too low to be used widely.

Another process as TW Pub. No. 201025415 and TW Pub. No. 201001476 were disclosed; in which zinc, zinc-plated, or aluminum substrate was roughened, afterwards, the substrate surface was immersed in a solution containing single-wall carbon nano tube, double-wall carbon nano tube, wall-less carbon nano tube, multi-wall carbon nano tube, carbon nano fiber, coil shaped carbon nano fiber, nano diamond, or other carbon nano materials, so that the surface of the substrate can be coated with a layer of nano carbon materials in order to fabricate a field emission cathode. Among these prior arts, even the carbon nano fiber had better field emission characteristics than the carbon nano tube, the fractional yield of the carbon nano fiber was low, and the aspect ratio of the carbon nano fiber was small due to the rapid growth of the carbon nano fiber triggered by metals like nickel, zinc, or aluminum, so that when the carbon nano fiber is applied to be as a field emission cathode, the overall electron beams emitted from the field emission cathode are still insufficient.

Other prior arts such as U.S. Pat. No. 6,333,016 and US Pub. No. 20020090468 have provided processes for fabricating carbon nano tubes, in which reduced metals were used to germinate carbon nano tubes, and more particularly, catalytic particles contain at least one metal from Group VIII, and at least one metal from Group VIb as assisted metal catalysts for germinating the carbon nano tubes. Furthermore, manners of chemical replacement of metals were also disclosed under TW Pat. No. I274789 and TW Pub. No. 200743677 for fabricating carbon nano tubes, where composited metal microparticles such as nickel-cobalt, nickel-gold, nickel-platinum, cobalt-palladium or cobalt-platinum were used for growing carbon nano tubes. However, reduction reactions of these manners using metal catalysts and assisted metal catalysts were difficult to control, and the uniformity of the carbon nano tubes grown by using these manners was insufficient, such that field emission generated by these manners was poor, thereby the luminance quantity of the field emission lighting source was unlikely to be enhanced.

What is more, TW Pub, No, 201014787 and a paper published by J. X. Hung, Jun Chen et al. (J. Vac. Sci. Technol. B, vol. 26, 1700) disclosed that by using the thermal chemical vapor deposition process, where stainless steel filaments was used as a substrate, and iron, cobalt, nickel, rhodium, palladium, or platinum was used as a catalyst, carbon nano tubes can be formed with high sintering temperature for fabricating field emission cathode filaments. These field emission cathode filaments can be combined with an anode fluorescence tube to form a field emission lighting tube. According to some disclosures, including U.S. Pat. No. 7,098,112, US Pub. No. 20050023950, and JP2008-254757, nano carbon materials, majorly carbon nano tubes, can be grown on a silicon cathode carrier with cobalt catalysts. Besides, except the carbon nano tubes, other nano materials grown on the silicon carrier are also included such as carbon nano fibers, carbon nanohorns, carbon nanofilament walls, and so on. In US20060142148, US20110014368, U.S. Pat. No. 7,923,403, U.S. Pat. No. 7,396,798, and U.S. Pat. No. 7,968,489, palladium, oxidized metals, or sulfurized metals may be used as catalyst for growing carbon nano tubes, single-wall carbon nano tubes, or graphene. Moreover, TW Pub. No. 201012964 has disclosed that unsaturated vinyl monomers and hydrophilic monomer copolymer of noble metal catalysts were used to grow carbon nano tubes. However, the final yield of the coiled carbon nano tubes and coiled carbon nano fibers grown by using these processes are insufficient, and the diameters of the carbon nano tubes are about 200 nm~300 nm as well as the aspect ratios of carbon nano tubes are too high to use in field emission. Accordingly, carbon nano tubes with relatively smaller aspect ratios were disclosed under U.S. Pat. No. 8,044,581, where the diameter and lengths of such carbon nano tubes ranges from 5~10 nm and 20 nm~1 µm, respectively. As above, carbon nano tubes are linear shaped, and electrons can only be emitted at the tip of the carbon nano tubes, so that the electron beams emitted therefrom are limited, even the intensity of the electron beams might be enhanced by increasing the emitting electric potential during field emission, the working life of the field emission lighting source would be significantly shortened as a side effect.

Hence, it is the major issues of field emission lighting sources to grow coiled-structured nano carbon materials applied to field emission cathodes with high fractional yields, and to be endure the consequence of applying higher driving electric potentials to provide higher luminance quantities.

SUMMARY OF THE INVENTION

According to the aforementioned issues, an aspect of the present disclosure is to provide a method for fabricating field emission cathode, a field emission cathode thereof, and a field emission lighting source using the same, in order to overcome numerous disadvantages in prior arts such as high cost, short working life of the field emission lighting source, low luminance uniformity, low luminance quantity, etc.

According to an aspect of the present disclosure, a method for fabricating field emission cathode is provided and includes the following steps.

Step 1: providing a cathode substrate, forming a metal conductive layer on the cathode substrate, and cleaning a surface of the metal conductive layer;

Step 2: providing a noble metal catalyst solution which containing a noble metal catalyst in, and immersing the cathode substrate in a noble metal catalyst solution, and forming a noble metal catalyst crystallite nucleus layer on the metal conductive layer of the cathode substrate by self-assembly of the noble metal catalyst.

The noble metal catalyst is selected from the group consisting of a first catalyst group, a second catalyst group, and combinations thereof, in which the first catalyst group is selected from an organic chelate compounded of platinum, palladium, rhodium, chrome, ruthenium, osmium, or iridium, and mixtures thereof, the organic chelate is a copolymer of styrene monomer and N-isopropylacrylamide monomer (Poly(Styrenea-Co-NIPAAmb), or polystyrene oligomer, and the second catalyst group is selected from an solution of chloride, sulfate, acetate, and mixtures compounded of platinum, palladium, rhodium, chrome, ruthenium, osmium, iridium, and mixtures thereof.

Step 3: drying the cathode substrate having the noble metal catalyst crystallite nucleus layer thereon, such that the noble metal catalyst crystallite layer is bonded with the conductive metal layer of the cathode substrate;

Where a drying temperature can be applied, usually, ranged from room temperature to 150° C., preferably, does not damage the noble metal catalyst. Furthermore, other drying processes are also acceptable, such as nitrogen drying, etc.

Step 4: disposing the cathode substrate having the noble metal catalyst crystallite nucleus layer thereon in a vacuum chamber, introducing an inert gas and a carbon source gas into the vacuum chamber, and heating the vacuum chamber to a predetermined growth temperature Tk by using a thermal chemical vapor deposition (TCVD) process;

The TCVD process is performing a vacuumed environment with an initial vacuum for degassing, then is introducing a mixture of a carbon source gas and an inert gas into the chamber, in which the carbon source gas can be a hydrocarbon gas, more preferably, without oxygen. The vacuum chamber is then heated to a predetermined growth temperature Tk.

Step 5: drawing a field emission cathode having a composited nano carbon material layer on the cathode substrate after a predetermined growing time and cooling;

The composited nano carbon material layer is formed with a predetermined growing time, and then the composited nano carbon material layer can be grown on the cathode substrate in order to form a field emission cathode. The aforementioned composited nano carbon material is a mixture of coiled nano carbon material and other kinds of nano carbon materials, such as linear carbon nano tube, linear carbon nano fiber, and a small quantity of graphite, graphene, or other forms of graphite; the coiled nano carbon material is a mixture of coiled carbon nano tube (so abbreviation as coil-CNT) and coiled carbon nano fiber (so abbreviation as coil-CNF), the coil-CNT is coil-shaped, and the coiled carbon nano fiber is coil-shaped as well.

Composited nano carbon materials with high purity can be fabricated on the cathode substrate by using the aforementioned method which only utilizes the first catalyst group, and the measured quantity of the coiled nano carbon material (the total of coil-CNT and coil-CNF) of the composited nano carbon material layer in a total measured quantity of the composited nano carbon material is, in average, at least 40%; that is, the average quantity of each surface area on the composited nano carbon material layer satisfies:

$$\frac{C_{Coil-CNT} + C_{coil-CNF}}{C_T} \geq 40\%.$$

Where $C_{coil-CNT}$ is the measured quantity of coil-CNT, $C_{coil-CNF}$ is the measured quantity of coil-CNF, $C_T$ is the total measured quantity of nano carbon material. Further, the measured quantity is the total quantity of nano carbon material in each surface area on the composited nano carbon material layer counted by using a scanning electron microscope (SEM).

On the other hand, while fabricating the composited nano carbon material with high purity by using the aforementioned method which utilizes the second catalyst group (or even utilizes the organic chelate of the first catalyst group) to a metal cathode substrate (or a non-metal cathode substrate with electroless plating), the measured quantity of the coiled nano carbon material of the composited nano carbon material layer in the total composited nano carbon material is, in average, at least 60%; that is, the measured quantity of each surface area on the composited nano carbon material layer satisfies:

$$\frac{C_{Coil-CNT} + C_{coil-CNF}}{C_T} \geq 60\%.$$

Based on the purpose of obtaining a flatter composited nano carbon material layer of the field emission cathode, a post-processing step, step 6, may be performed.

Step 6: disposing the field emission cathode in an atmosphere chamber, and heating the atmosphere chamber to a predetermined post-processing temperature (Tc) in an inert gas environment.

The predetermined post-processing temperature (Tc) can be above 200° C., where the post-processing period can be shortened by using a higher temperature. For example, the predetermined post-processing temperature can be 200° C.≤Tc≤500° C.

According to the field emission cathode fabricated via the step 5 or the step 6 of the method of the present disclosure, in which the composited nano carbon material layer is consist of composited nano carbon material, carbon nano tubes, and a minor quantity of nano carbon materials. The composition proportion thereof varies and depends on the selected noble metal catalyst, the initial vacuum, the predetermined growth temperature, and the predetermined growing time. According to different examples, the measured quantity of the coiled nano carbon material (total mix of coil-CNT and coil-CNF) of the composited nano carbon material layer in the total composited nano carbon material can be greater than or equal to 50%. According to other examples, the measured quantity of the coiled nano carbon material (total mix of coil-CNT and coil-CNF) of the composited nano carbon material layer in the total composited nano carbon material can be greater than or equal to 80%. Comparing to carbon nano tube or other nano carbon materials, coiled carbon nano tube and coiled carbon nano fiber have better field emission characteristics, so that different mixing ratios of coiled carbon nano tube and coiled carbon nano fiber can be utilized for adjusting field emission characteristics under the present disclosure, such as the current-voltage curve, the field emission turn-on voltage (Vc). As shown in FIG. 3, different growth temperature and different growing time causes different ratios of the produced coiled carbon nano tube and coiled carbon nano fiber, so that the field emission turn-on voltage (Vc) can be adjusted accordingly.

The cathode substrate of the aforementioned method for fabricating a field emission cathode of the present disclosure may be a silicon substrate, a glass substrate, an alumina ceramic substrate, a substrate electroplated with indium tin oxide, a metal substrate or combinations thereof.

The surface of the cathode substrate of the aforementioned method for fabricating a field emission cathode of the present disclosure may be covered by a metal conductive layer, where the metal conductive layer can be made of iron-nickel alloy, iron-cobalt-nickel alloy, nickel, nickel-copper, copper, copper alloy, and the cathode substrate may be a silicon, glass, or alumina ceramic substrate electroplated or doped with nickel, an indium tin oxide electroplated substrate, or combinations thereof.

When a silicon substrate, a glass substrate, an alumina ceramic substrate, a substrate electroplated with indium tin oxide, or a metal substrate the cathode substrate is selected to be used as the cathode substrate, the noble metal catalyst is selected from the first catalyst group; whereas when an iron-nickel alloy substrate, an iron-cobalt-nickel alloy substrate, a nickel substrate, a nickel-copper substrate, a copper substrate, a copper alloy substrate, a silicon, glass, or alumina ceramic substrate electroless plated or doped with nickel, the noble metal catalyst is appropriately selected from the second catalyst group or the second catalyst group followed by the first catalyst group.

Furthermore, according to the aforementioned method of the present disclosure, in which the degree of the initial vacuum may be higher than a degree of vacuum of 0.1 torr, and the predetermined growth temperature Tk may be:

$$500° C. \leq Tk \leq 900° C.$$

While using the first catalyst group, the predetermined growth temperature Tk is between 500° C. and 900° C., whereas while using the second catalyst group, the predetermined growth temperature Tk is between 550° C. and 900° C.

In addition, the carbon source gas is acetylene, methane, or combinations thereof, the inert gas is hydrogen, argon, helium, or combinations thereof, and the predetermined growing time is 5 min to 60 min.

According to another aspect of the present disclosure, a field emission cathode fabricated by the step 1 to the step 5, or the step 1 to the step 6 of the aforementioned method is provided, the cathode substrate includes, from the inside to the outside: a cathode substrate and a composited nano carbon material layer. In which the cathode substrate can be a silicon substrate, a glass substrate, a alumina ceramic substrate, a metal substrate, a ceramic substrate, an indium tin oxide substrate, metal substrate, metal stereo substrate, a non-conductive stereo substrate, or combinations thereof. When the cathode substrate is a iron-nickel substrate, a iron-cobalt-nickel substrate, a nickel substrate, a nickel-copper substrate, a copper substrate, a copper alloy substrate, a silicon, glass, or alumina ceramic substrate electroplated or doped with nickel, an indium tin oxide electroplated substrate, or combinations thereof, the surface of the cathode substrate has at least a metal conductive layer; when the cathode substrate is made of non-metal materials, the surface of the cathode substrate can be covered by a metal conductive layer, where the metal conductive layer can be made of iron-nickel alloy, iron-cobalt-nickel alloy, nickel, nickel copper, silver.

According to the field emission cathode of the present disclosure, the measured quantity of the coiled nano carbon material of the composited nano carbon material layer in a total of the composited nano carbon material is at least 40%.

In addition, an initial field emission electric potential Vc and an initial electric field Ec of the field emission cathode satisfies the following condition either $$Vc \leq -4.0 kV; or$$

$$0.7 V/\mu m \leq Ec.$$

Wherein Vc represents a field emission turn-on voltage of the field emission cathode, and is the voltage corresponding to an electric current being 0.1 mA in the electric field (see FIG. 13(B)); and Ec represents a turn-on electric field intensity of the field emission cathode, and is the lowest electric field intensity at an electric current density of 0.01 mA/cm² occurred in the electric field. (see FIG. 13(A)).

According to another aspect of the present disclosure, a field emission lighting source is provided and includes a field emission cathode, a field emission anode, and a power supply, the field emission cathode and the field emission anode are packaged in a light-transmissive vacuum envelope, whereby a light beam can be emitted driven by a power provided by the power supply; the field emission cathode may be the field emission cathodes mentioned above, where the composited nano carbon material layer is germinated and grown on the field emission cathode; a measured quantity of the coiled nano carbon material (total coil-CNT and coil-CNF) in a total of the composited nano carbon material is at least 40%.

Further, the field emission anode includes an anode substrate and a phosphor; where the anode substrate is a glass substrate, an indium tin oxide glass substrate, a metal substrate, or combinations thereof, in which the anode substrate may be in various forms, such as filaments, rod-like, reticular, laminar, coiled, dendrimer-like, or combinations thereof, the phosphor is disposed in the anode substrate.

Moreover, the power supply has a first output and a second output, in which the first output is connected to the field emission cathode, and the second output is connected to the field emission anode. When an electric potential is supplied by the power supply, an electric field can be formed between the field emission cathode and the field emission anode. When the electric potential of the electric field exceeds the initial field emission electric potential Vc, electrons can be emitted from the coiled carbon nano tube and the coiled carbon nano fiber of the composited nano carbon material layer of the field emission cathode. If a small quantity of other carbon nano materials remains on the composited nano carbon material layer, a small quantity of electron may be emitted as well from those materials when the electric potential of the electric field exceeds the initial field emission electric potential Vc. Those emitted electrons collide the phosphor and generates light, thereby constituting a lighting source.

According to the lighting source of the present disclosure, in which the electric potential supplied from the power supply may be a direct-current voltage, the first output of the power supply is a direct-current negative voltage, and the second output of the power supply is a direct-current positive voltage. The relative electric potential of the first output to the second output is lower than −4.0 kV. Alternatively, the electric potential supplied from the power supply may be a alternating-current (AC) voltage, and the full time period thereof is represented as T, a time period of which the electric potential of the first output exceeds −4.0 kV in a full time period is represented as Te, where Te/T>10%; that is, the output during at least 10% of the full time period of loading is lower than −4.0 kV. Alternatively, the electric potential supplied from the power supplier may be a pulse voltage, and the full time period thereof is represented as T, a time period of which the electric potential of the first output exceeds −4.0 kV in a full time period is represented as Te, where Te/T>10%; that is, the output during at least 10% of the full time period of loading is lower than −4.0 kV.

In conclusion, the method for fabricating field emission cathode, the field emission cathode thereof, and the field emission lighting source using the field emission cathode of the present disclosure has numerous advantages listed below By using the method for fabricating field emission cathode of the present disclosure, which utilizes the amphipathic characteristic (hydrophilic and non-hydrophilic) of the organic noble metal catalyst or the co-alloying of replacing the metal of the cathode substrate with the noble metal catalyst, the noble metal catalyst can be bounded with the field emission cathode substrate. Additionally, by performing the deposition of the noble metal catalyst and the pyrolysis of the carbon source gas in a high temperature and a vacuumed environment by using TCVD, the nano carbon materials can be grown which catalyzed by the noble metal catalyst. Due to the great dispersity of the noble metal catalyst depositing on the field emission cathode substrate, namely unlikely to be aggregated, high density coiled nano carbon materials, including coiled carbon nano tubes and coiled carbon nano fibers, with single or specific fractional yield can be fabricated by using different operation conditions, thereby overcoming the limitation and low fractional yields of growing coiled carbon nano tubes and coiled carbon nano fibers in prior art.

The present disclosure provides the method for fabricating field emission cathode, and the field emission cathode fabricated by the method, the surface of the field emission cathode can geminate and grow coiled nano carbon materials with high fractional yield, so that the coiled carbon nano tubes and the coiled carbon nano fibers have more nano corners than chained CNT made by using conventional methods. These nano corners are like the end tip of carbon nano tubes, which are capable of emitting electrons therefrom. While applying an electric field to the field emission cathode, the coiled nano carbon materials can be emitted with much more electron beams, thereby forming a more even field emission cathode with better field emission characteristics.

By using the method for fabricating field emission cathode of the present disclosure with different operation conditions, a specific fractional yield of coiled nano carbon materials can be obtained, and different field emission turn-on voltage may be provided. In the condition of same electric current applied, the field emission cathode of this invention may utilize a higher voltage to provide a higher strength of electron beams; alternatively, the field emission cathode of this invention may utilize a relatively lower field emission turn-on voltage to the field emission cathode to provide a more evenly electron beams.

According to the field emission cathode and the field emission lighting source of the present disclosure, by applying different voltage thereto may enhance the brightness of the field emission lighting source with low electric current in the state of without diminution to the phosphor layer ability and steadily maintaining high luminous efficiency.

Regarding with the field emission lighting source of the present disclosure, by vacuum packaging the field emission cathode and the field emission anode, a steady field emission lighting source of the present disclosure may be formed. The field emission lighting source is no need of mercury, halogen, or other hazardous articles, and so to perform a high environmental value. Additionally, according to the field emission characteristics, the light emitted from the field emission lighting source of the present disclosure has advantages such as high brightness, great color rendering (CRI), and so on. So that the field emission lighting source can be used in general luminance, lighting of agricultural planting, or other kinds of lights in various electronics, etc.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The structure and technical features of the present invention will now be described in considerable detail with reference to some embodiments and the accompanying drawings thereof, so that the present invention can be easily understood.

Figure 5:
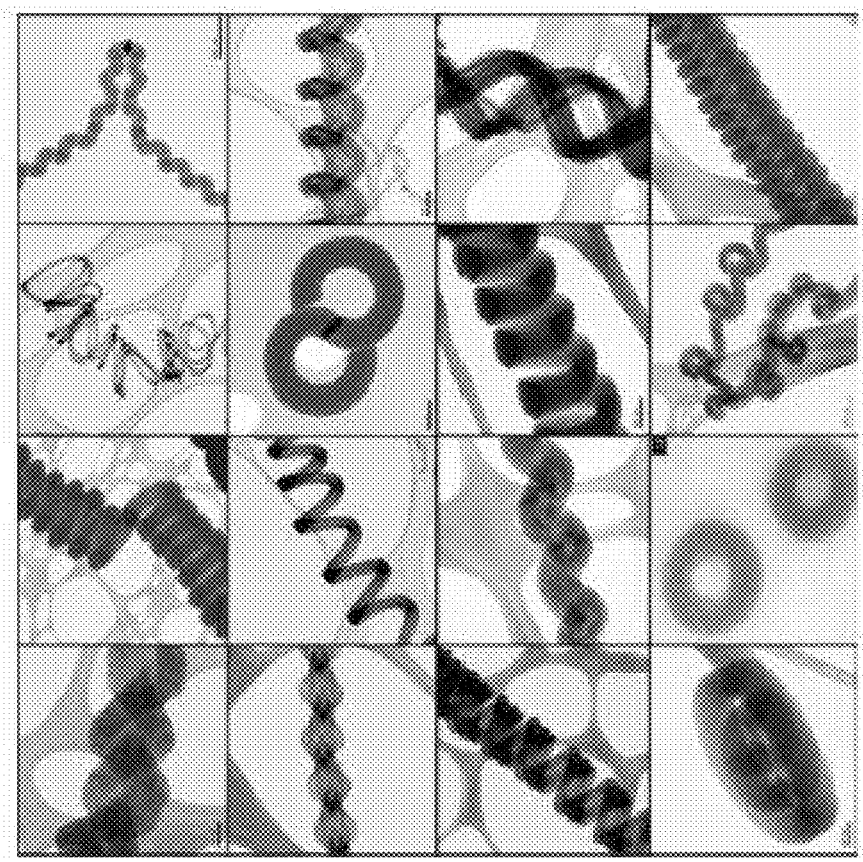
FIG. 5 is a topography of different nano carbon materials.
Figure 7:
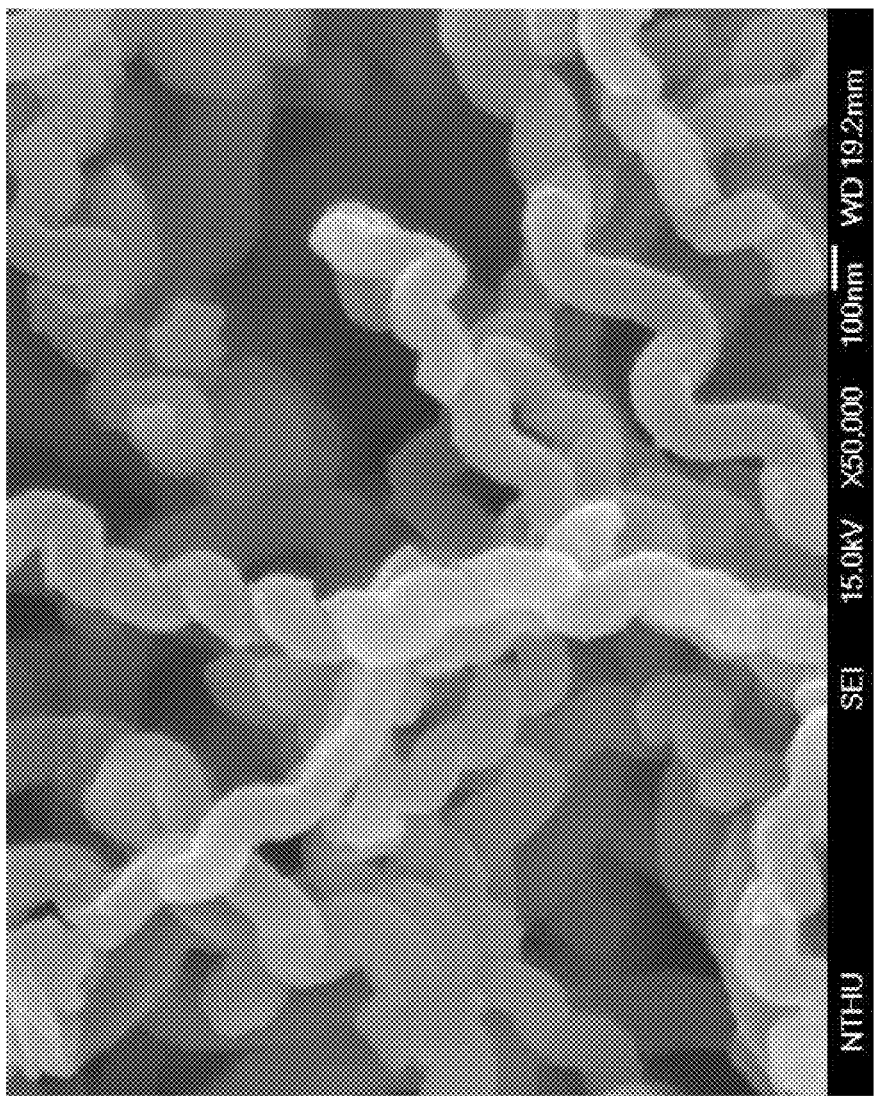
FIG. 7 is a TEM image of different topologies of coiled nano carbon materials.
Figure 8:
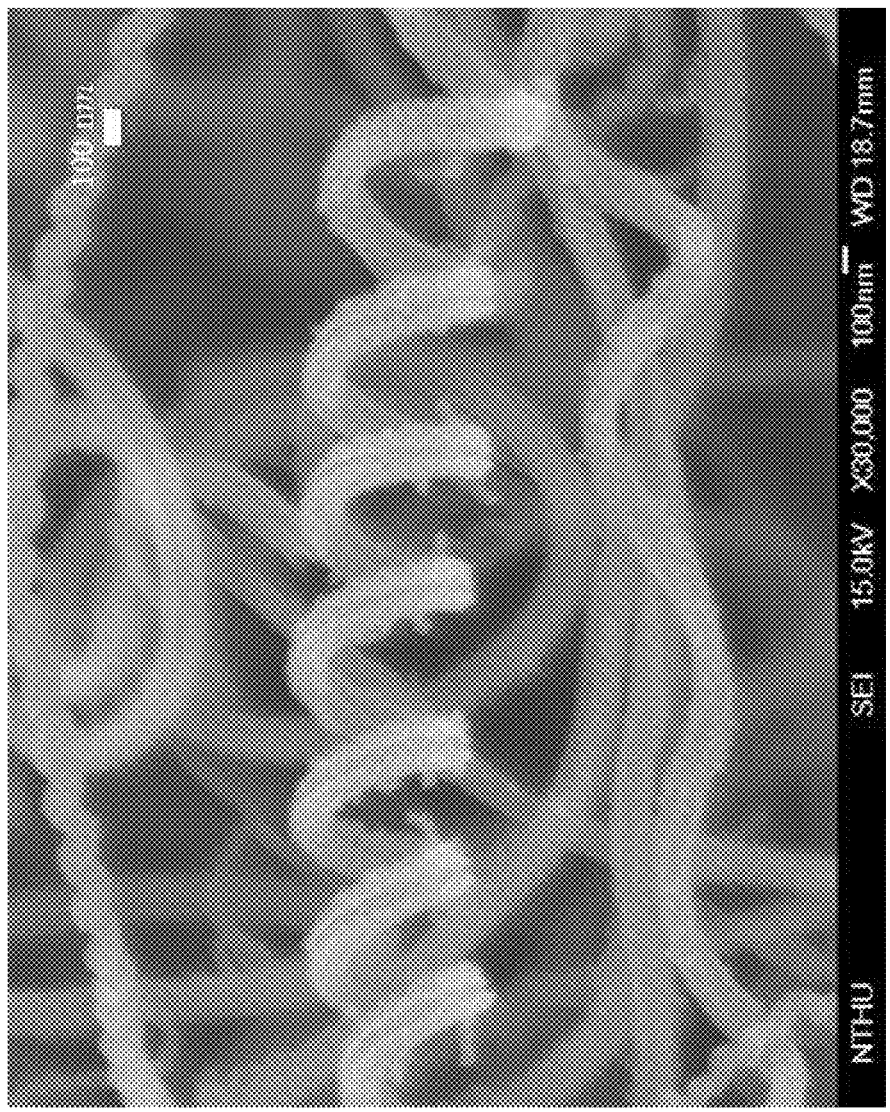
FIG. 8 is another TEM image of different topologies of coiled nano carbon materials.

The principle of the field emission lighting is based on a quantum tunneling effect performed by an electric field of the field emission cathode; while an electric field having a proper electric potential is applied to the field emission cathode and the field emission anode, the vacuum level around the surface of the field emission cathode will be reduced and so that electrons will be emitted from the field emission cathode. These emitted electrons will then collide to the phosphor of the field emission anode thereby generating light. According to Fowler-Nordheim equation of the field emission principle, a field emission turn-on voltage can be reduced and a field emission current can be enhanced by lowering the working function of the field emission cathode. Since the very high band gap of carbon nano materials, about 5.45 eV (varies by different carbon nano materials) that a negative electron affinity will be around −1 eV. The field emission turn-on voltage of carbon nano materials remains relatively low (the field emission turn-on voltage is 3~10 V/μm while a electric current density is 10 μA/cm$^2$). Therefore, comparison with other materials, nano carbon materials can bear much more higher electric current density and more suitable for being applied as the material of the field emission cathode. Among different carbon nano materials, the inventor herein have found that coiled carbon nano tube and coiled carbon nano fiber are coiled structures, referring to FIG. 5, FIG. 7 and FIG. 8, which have band gaps approaches to the carbon nano tubes but the field emission turn-on electric field Ec of the coiled carbon nano tube or coiled carbon nano fiber can be 0.75~0.8 V/μm, namely the electric field intensity while J=001 mA/cm$^2$ in the J-E curve, and the field emission electric current density may be higher than 10 mA/cm$^2$, namely the electric current while the voltage equals Vc in the I/V curve. Furthermore, there are numerous nano corners included in the coiled carbon nano tubes and the coiled carbon nano fibers, thus are providing numerous electron emitting spots. Additionally, the coiled carbon nano tubes or the coiled carbon nano fibers are also capable of bearing higher electric currents, and has better field emission characteristics than carbon nano tubes. FIG. 7 is a TEM image showing twist-shaped coiled carbon nano tubes and coiled carbon nano fibers; FIG. 8 is another TEM image showing spring-shaped coiled carbon nano tubes and coiled carbon nano fibers.

Carbon nano material growing techniques can be roughly classified into two classes, that is, the vapor deposition method and the high temperature decomposition method, and these methods are majorly to transform carbon atoms deposited on activated metal atoms into the carbon nano materials. The inventor herein found that, by using different activated metal atoms, different growing method and different temperature conditions, different carbon nano materials with different fractional yields can be germinated and grown. In general, carbon nano materials grown on the surface of metals such as copper, iron, or nickel, has shorter growing period, but the diameters of those carbon nano materials are larger, whereas coiled carbon nano materials grown on the surface of noble metal catalysts like platinum, palladium, rhodium, chromium, ruthenium, osmium, iridium, has smaller diameters.

Figure 3:
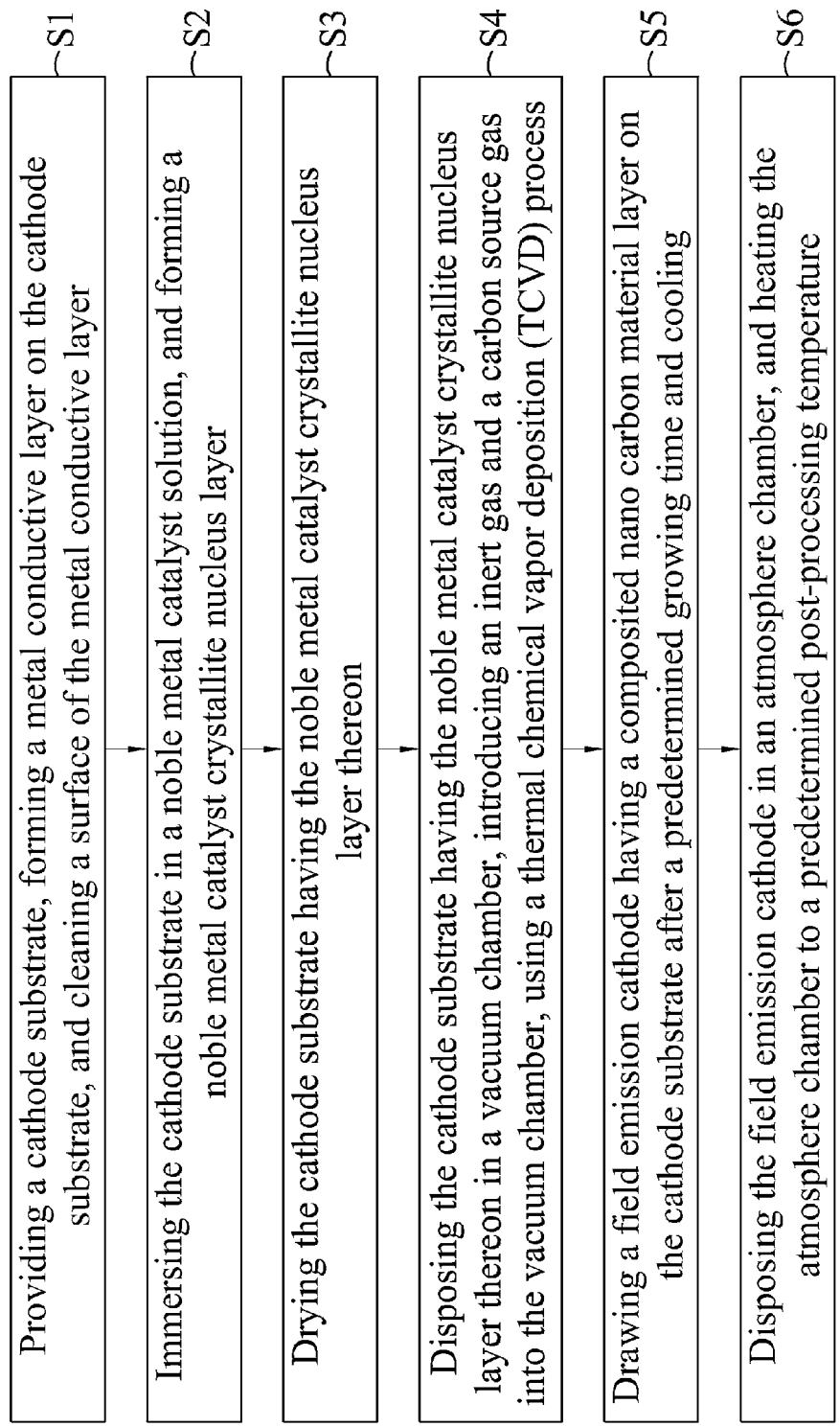
FIG. 3 is a flow chart of a method for fabricating field emission cathode of the present disclosure.

FIG. 3 is a flow chart of a method for fabricating field emission cathode of the present disclosure, where a cathode substrate 10 is immersed in or covered by a noble metal catalyst solution 30 having noble metal catalysts 31, and then a noble metal catalyst crystalline nucleus layer may be formed on the surface of the cathode substrate 10. Afterwards, by using thermal chemical vapor deposition process, a carbon source gas is introduced thereto and is then pyrolyzed, and composited nano carbon materials is grown on the cathode substrate 10 thereafter. The method includes the following steps.

Step S1: The cathode substrate 10 is provided, where the cathode substrate 10 can be made of metal or non-metal materials, in which the metal materials include stainless materials like iron-nickel alloy, iron-cobalt-nickel alloy, nickel based materials like nickel or nickel-copper, electrically conductive materials like silver or copper alloy, which are not limited thereto. When the cathode substrate 10 is made of non-metal materials such as glass or ceramics, a metal conductive layer 11 can be formed on the cathode substrate 10 by covering a metal conductive layer; alternatively, the metal conductive layer 11 may also be formed by an electroplating, an electroless plating or a doping manner, or by coating a layer of indium tin oxide. The manners of forming the metal conductive layer 11 should not be limited to those mentioned above. Additionally, the shape of the cathode substrate 10 can be, but should not be limited to stereo, plate-like, bar-like filament-like, etc.

The cathode substrate 10 is first to be cleaned by physical sand blasting, washing with cleaning agents like organic solvents (e.g. acetone, alcohol, etc.) or degreasing solutions, or chemical etching, but should not be limited to. According to the chemical etching manner, the cathode substrate 10 made of #304 stainless steel (iron-cobalt, nickel alloy) is cleaned with acetone and 10% HCl, rinsed with deionized water, and then dried with nitrogen gas in the following first embodiment. Furthermore, in regard with the sixth embodiment, a glass-made cathode substrate 10 is cleaned by using the physical sand blasting manner.

Figure 1:
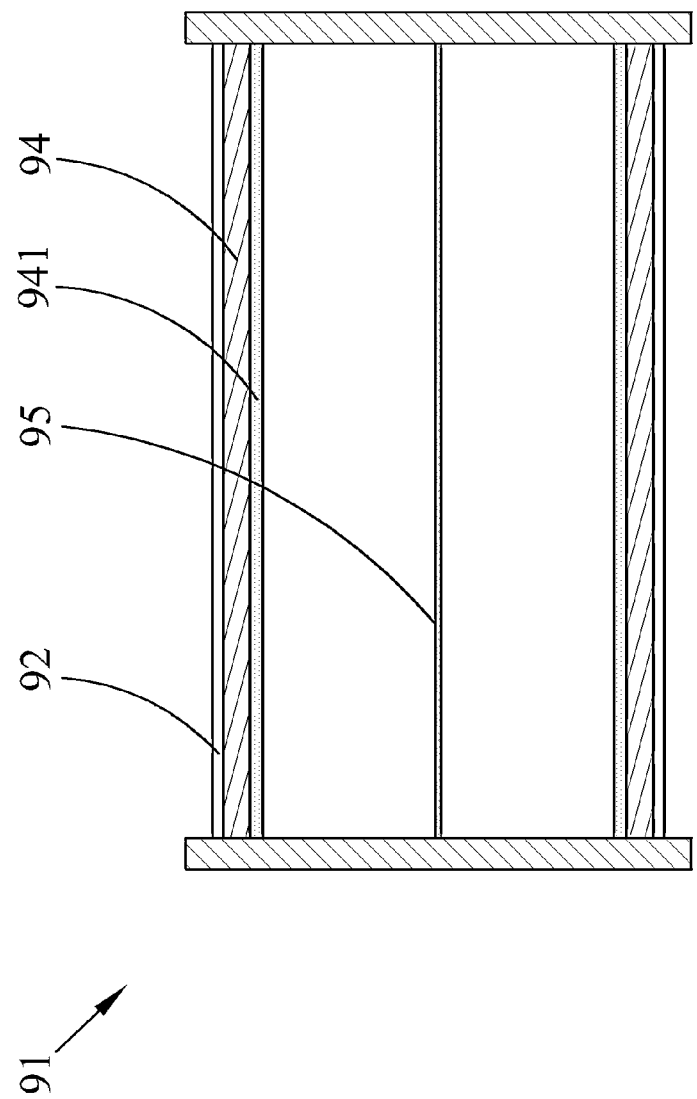
FIG. 1 is a schematic diagram of prior art of a field emission lighting source.
Figure 2:
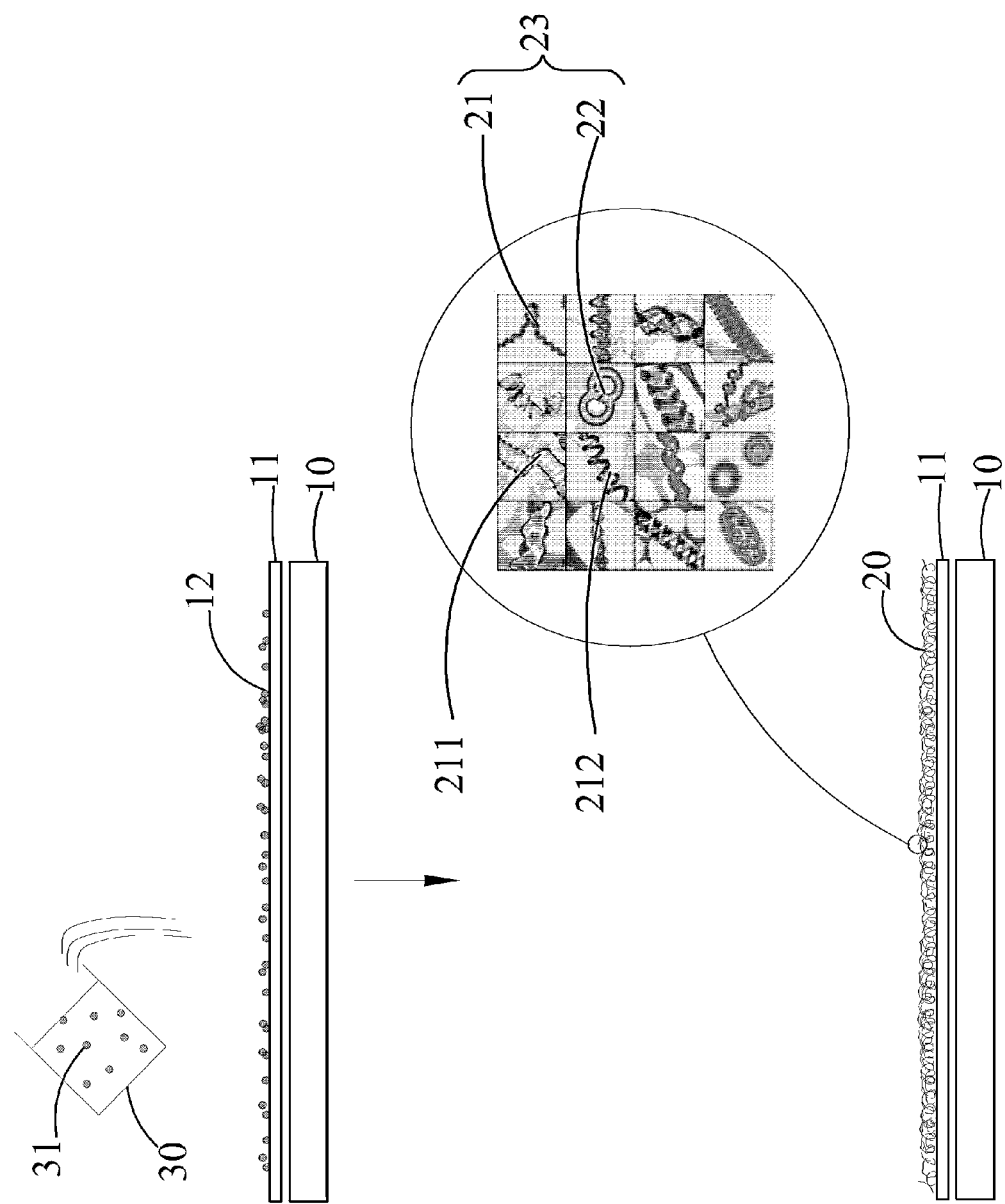
FIG. 2 is a schematic diagram illustrating a method for fabricating field emission cathode of the present disclosure.

Step S2; Referring to FIG. 2, the noble metal catalyst solution 30 having the noble metal catalyst 31 is prepared first, and then the cathode substrate 10 with the metal conductive layer 11 formed thereon is immersed into the noble metal catalyst solution 30, where the noble metal can be, but should not be limited to platinum, palladium, chromium, osmium, iridium, ruthenium, and rhodium; the noble metal catalyst solution 30 can contain the noble metal catalyst 31 which is chelated by an organic chelate, or the noble metal catalyst 31 of noble metals associated with chloride, sulfate, or acetate, thereby forming a noble metal catalyst crystalline nucleus layer 12 on the metal conductive layer 11 of the cathode substrate 10.

Figure 6:
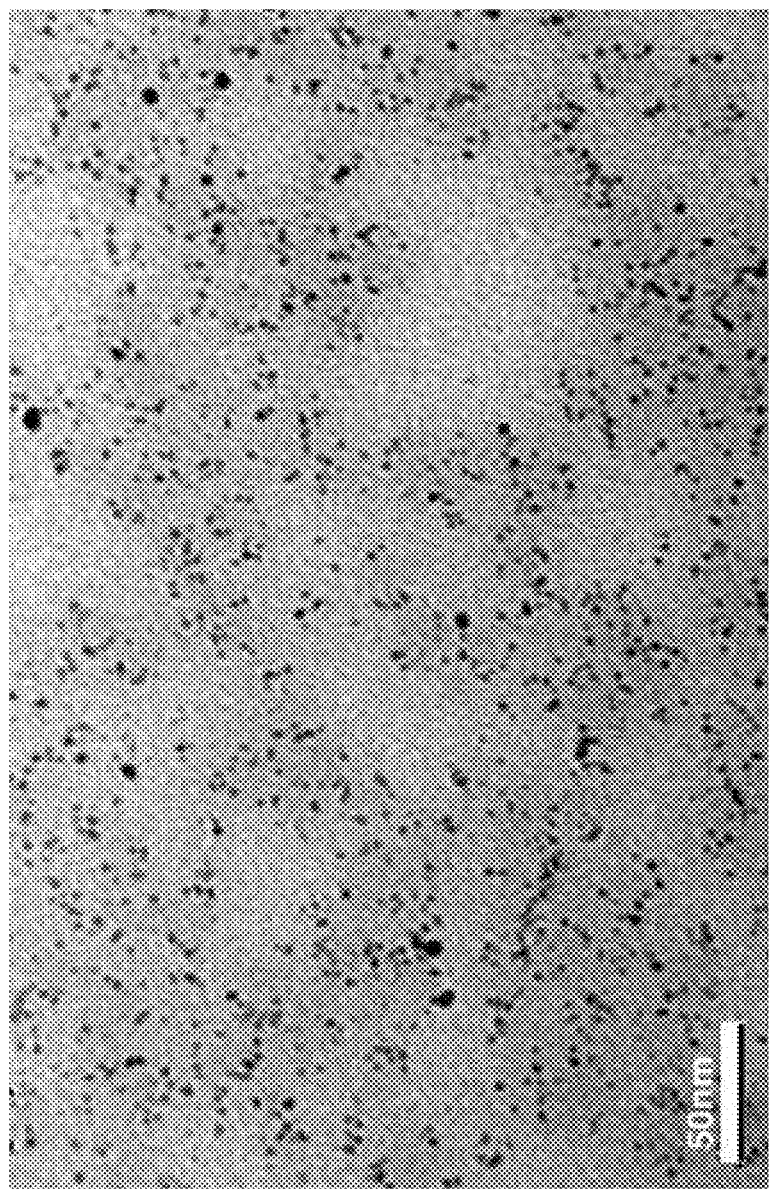
FIG. 6 is an TEM image of a noble metal catalyst crystalline nucleus layer on a surface of a cathode substrate of the present disclosure.

The noble metal of the noble metal catalyst 31 chelated with the organic chelate may be platinum, palladium, chromium, osmium, iridium, ruthenium, and rhodium; for instance, alternatively, the noble metal catalyst can be chelated with an organic chelate constructed of polystyrene composite materials of the metal nanoparticles disclosed under TW Pat. No. I324616, the organic chelate can also be copolymer of styrene and N-isopropylacrylamide monomer, or polystyrene oligomer; For the purpose of better understanding and comparison, palladium chelated copolymer of styrene monomer and N-isopropylacrylamide monomer (Pd (styrenea-co-NIPAAmb)) is taken as an example of the organic chelated noble metal catalyst 31 in the following, and the scope of the invention should not be limited to this. In which the process for fabricating Pd(styrenea-co-NIPAAmb) is in accordance with a paper published by Yih-Ming Liu, Ming-Der Ger, et al. "Low temperature fabrication of Ni—P metallic patterns on ITO substrates utilizing inkjet printing"; Microelectronics Reliability Vol 52, Issue 2, February 2012. FIG. 6 is an TEM (Transmission Electron Microscope) image of a noble metal catalyst crystalline nucleus layer 12 (which uses Pd(styrenea-co-NIPAAmb)) on a surface of a cathode substrate of the present disclosure;

Step S3: The cathode substrate 10 having the noble metal catalyst crystalline nucleus layer 12 formed thereon is dried; where the drying temperature is usually room temperature to 200° C., which, preferably, does not damage the noble metal catalyst 31. Furthermore, other drying manners are also suitable, such as nitrogen drying, etc.

Step S4: The cathode substrate 10 having the noble metal catalyst crystalline nucleus layer 12 formed thereon is disposed in a vacuum chamber, and types of the vacuum chamber are usually capable of bearing a high degree of vacuum and high temperatures, such as quartz tube.

By using a thermal chemical vapor deposition (TCVD) process, the vacuum chamber is first vacuumed with an initial vacuum that the degree of vacuum is preferably higher than a degree of vacuum of 0.1 torr for degassing.

Under the initial vacuum, carbon source gas and inert gas is introduced into the chamber, where the carbon source gas can be hydrocarbon ($C_nH_m$) gas, more preferably, without oxygen, such as acetylene gas, methane gas or a mixture thereof; the inert gas can be hydrogen, argon, helium, or mixtures thereof. Before continuing on the TCVD process, the chamber is then introduced with the inert gas for degassing or further activating the noble metal catalyst crystalline nucleus on the cathode substrate 10. Then by using high temperature annealing, the catalyst nanoparticles are formed from the noble metal catalyst 31 on the cathode substrate 10.

The vacuum chamber is then heated to a predetermined growth temperature Tk for a predetermined growing time; the carbon source gas ($C_nH_m$) releases carbon atoms for the need of growing nano carbon materials, by being pyrolyzed which catalyzed by the noble metal catalyst in a high temperature environment, and the carbon atoms are further adhered and deposited to the surface of the noble metal catalyst, thereby growing composited nano material layer 20 thereon. The aforementioned predetermined growth temperature Tk and the predetermined growing time is based on the types of carbon source gas, the types of noble metal catalyst, the expected ratio of the grown coiled carbon nano tubes, and the expected aspect ratio of the grown coiled carbon nano tubes; generally, the predetermined growth temperature (Tk) is ranged from 500° C. to 900° C., and may refer to a temperature-time curve of heating; the predetermined growing time can be, but not limited to 5 min to 60 min. However, when the predetermined growing time is over shortened, the yield of the nano carbon materials will be reduced, whereas time can also be wasted when the predetermined growing time is over extended, and, consequently, causing uneven stacking of the nano carbon materials as well.

Step S5: After the predetermined growing time, a composited nano carbon material layer 20 constructed of composited nano carbon materials 23 is grown on the cathode substrate 10. After cooling, the cathode substrate 10 having the composited nano carbon material layer 20 is ready for the field emission cathode 4. Referring to FIG. 2, the grown composited nano carbon material 23 of the composited nano carbon material layer 20 includes coiled nano carbon materials 21 and other types of nano carbon materials 22 where the coiled carbon material 21 is a mixture containing coiled carbon nano tubes 211 and coiled carbon nano fibers 212. The ratio of yields thereof is depended on the selected noble metal catalysts, the initial vacuum, the predetermined growth temperature, and the predetermined growing time.

By utilizing the aforementioned steps, the composited nano carbon material layer 20 with high purity can be fabricated, that is, the measured quantity of the coiled nano carbon material 21 (the total coil-CNT and coil-CNF) of the composited nano carbon material 23 of the composited nano carbon material layer 20 is at least, in average, 40%; that is, the average measured quantity in the composited nano carbon material layer satisfies:

$$\frac{C_{Coil-CNT} + C_{coil-CNF}}{C_T} \geq 40\%.$$

Where $C_{coil-CNT}$ is the measured quantity of coil-CNT, $C_{coil-CNF}$ is the measured quantity of coil-CNF, $C_T$ is the total measured quantity of nano carbon material; in which the measured quantity is the total quantity of nano carbon material is the composited nano carbon material layer counted by using a scanning electron microscope (SEM). In the following embodiments, for performing the topology of nano carbon materials more clearly, field emission scanning electron microscope (FE-SEM) is used to observe the measured quantities. It is worth to be mentioned that, by using different types of the cathode substrate 10, different types of the noble metal catalyst 31, different operational temperatures and time periods, the measured quantity of the coiled nano carbon material 21 in the composited nano material 23 is, in average, at least 20~30%. Nevertheless, based on the purpose of achieving better uniformity for in using in electron emission, the average measured quantity of the field emission cathode 4 is preferred higher than 40%.

Different concentration of the noble metal catalyst 31 causes different average diameter of the grown coiled nano carbon material 21, for instance, a concentration of 200~500 ppm of the noble metal catalyst 31 forms the coiled nano carbon material 21 with a diameter of 51.1±9.3 (nm), whereas a concentration of 500~800 ppm of the noble metal catalyst 31 forms the coiled nano carbon material 21 with a diameter of 154.2±23.9 (nm); different specifications of the coiled nano carbon material 21 can be acquired by adjusting operation conditions based on different purposes.

In the following embodiments, when using the copolymer of styrene monomer and N-isopropylacrylamide monomer chelated with palladium (Pd(styrenea-co-NIPAAmb)) as the organic chelated noble metal catalyst, the coiled nano carbon material 21 is grown along a two-dimensional direction from the noble metal catalyst 31 crystalline nucleus (palladium catalyst crystalline nucleus) with different coiling directions (clockwisely coiling or counterclockwisely coiling) while embedding the noble metal catalyst 31 crystalline nucleus (palladium catalyst crystalline nucleus) into the coiled nano carbon material 21 by using the TCVD process.

Generally, under the same concentration of the noble metal catalyst 31, the higher the predetermined growth temperature is, the larger the diameter of the catalyst crystalline nucleus of the noble metal catalyst crystalline nucleus layer 12 is; for instance, when the predetermined temperature Tk reaches 600° C., the formed coiled nano carbon material 21 is majorly twist-shaped coiled carbon nano tubes 211, and an average diameter thereof is about 150±38 nm; when the predetermined temperature Tk reaches 800° C., an outer diameter of the formed coiled carbon nano fibers 212 is about 176 nm, and an inner diameter thereof is about 96 nm; different types of the coiled nano carbon material 21 can be obtained by adjusting the operation conditions in these steps.

Because that the coiled carbon nano tubes 211 and the coiled carbon nano fibers 212 has relatively better field emission characteristics over carbon nano tubes or other nano carbon materials, different mixing ratios of coiled carbon nano tubes 211 and coiled carbon nano fibers 212 can be referred for adjusting field emission characteristics, such as the current-voltage curve and the field emission turn-on voltage (Vc) for providing better field emission characteristics.

Step S6 (post-processing): Based on the purpose of obtaining a flatter composited nano carbon material layer 20 of the field emission cathode 4, a post-processing step may be performed: disposing the field emission cathode 4 having the composited nano carbon material layer in an atmosphere chamber, and heating the atmosphere chamber to a predetermined post-processing temperature Tc with an inert gas such as nitrogen or argon introduced. Unstable nano carbon materials can be removed during this process, thereby enhancing the measured quantity of the coiled nano carbon material 21 of the post-processed composited nano carbon material layer 20 in the total composited nano carbon material to at least 44%; the predetermined post-processing temperature, Tc, is above 200° C., moreover, the predetermined post-processing temperature is not limited to $200° C. \leq Tc \leq 500° C.$; the uneven nano carbon materials in the composited nano carbon material layer 20 of the field emission cathode 4 can be removed, thereby flattening the composited nano carbon material layer 20 and enhancing the uniformity of field emission.

According to the aforementioned step S2, when the noble metal catalyst solution 30 is selected from a solution of chloride, sulfate, acetate, and mixtures compounded of platinum, palladium, rhodium, chrome, ruthenium, osmium, iridium, and mixtures thereof, and while immersing the cathode substrate 10 in the noble metal catalyst solution 30, the noble metal catalyst crystalline nucleus layer 12 can be formed by displacing the nickel, iron, copper, or cobalt to noble metal on the surface of the cathode substrate 10. In this step, by utilizing the reduction potential difference between nickel, iron, copper, or cobalt on the surface of the cathode substrate 10 and the noble metal ions in the noble metal catalyst solution 30, electrons released from the cathode substrate 10 by oxidation can be received by the noble metal ions in the noble metal catalyst solution 30, thereby precipitating and forming noble metal spots on the cathode substrate 10 directly during reduction thereof without adding other reducing agents for providing electrons needed during reduction. Hence, the noble metal spots can be distributed uniformly. Since that the noble metal is uniformly and thin, the nano-scaled noble metal catalyst 31 is thereby forming a uniformly noble metal catalyst crystalline nucleus layer 12 on the cathode substrate 10. In the following third and fifth embodiment, by utilizing the reduction potential difference between the cathode substrate 10 and the noble metal ions like palladium ions released from palladium chloride of the noble metal catalyst solution 30, while the reduction potential of the noble metal ion is greater than the reduction potential of the cathode substrate 10, the cathode substrate 10 will be dissolved by oxidation and electrons released therefrom. The electrons can be transferred from the metal ions to the noble metal ions, and so that the noble metal ions may receive the electrons and be reduced and precipitated on the surface of the cathode substrate 10. When the cathode substrate 10 is completely covered by the plated noble metal, the reaction will be suspended. This substitution is to heat a proper concentration of palladium chloride ($PdCl_2$) solution (e.g. 300~1500 ppm) of the noble metal catalyst solution 30 to 50~95° C. by a heating device, and then disposing the cleaned cathode substrate 10 like stainless steel substrate, metal electroless plated substrate, Ni—P composited metal substrate, silicon substrate, alumina substrate, etc, to the noble metal catalyst solution 30 for performing a reaction, and after the reaction is completed, the cathode substrate 10 is rinsed by deionized water and dried by nitrogen (or dried by heat). This process merely utilized the reduction potential difference between the cathode substrate 10 and the noble metal ions by releasing and transferring electrons from the cathode substrate 10 to the noble metal ions, and the noble metal thereby precipitating and forming the noble metal catalyst 31 on the cathode substrate 10 directly without additional reducing agents needed for providing electrons in reduction. The replacement mechanism is providing simplified process and controllable parameters, moreover, the crystalline nucleus of the noble metal catalyst 31 is excellent uniformity distribution.

According to the step of depositing nickel, copper or other metals on the cathode substrate 10, electroless plating or composited electroplating can be used to depositing metals on the surface of the cathode substrate 10, and then substituting the metal on the surface of the cathode substrate 10 to noble metal, and so that the noble metal catalyst crystalline nucleus layer 12 may be formed. For instance, a noble metal catalyst crystalline nucleus layer 12 of palladium and nickel can be formed on a nickel substrate. The following sixth embodiment, by utilizing palladium chloride and Ni—P, a co-catalyst crystalline nucleus layer of palladium and Ni—P as the noble metal catalyst crystalline nucleus layer 12 can be formed on the cathode substrate 10, the co-catalyst crystalline nucleus layer of palladium and Ni—P can be formed on the cathode substrate 10 made of metal or non-metal. For instance, in the fifth embodiment, the co-catalyst crystalline nucleus layer of palladium and Ni—P can be formed on a non-metal glass cathode substrate 10 by using a chemical plating process with Ni—P; the principle of the chemical plating is to utilize the effect of the release of electrons during hydrolysis and self-catalyzed dehydrogenation of a reducing agent $H_2PO_2$ while being heated and catalyzed, thereby driving $Ni^{2+}$ to receive the released electrons and to be reduced to Ni thus depositing on the surface of the cathode substrate 10:

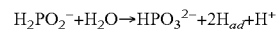

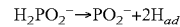

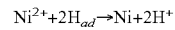

Furthermore, the deposition of P element is a result of the reduction of hydrogen and the self-oxidation of $H_2PO_2^-$:

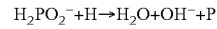

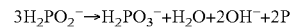

The composited nano carbon material layer 20 of the composited nano carbon material, which is fabricated with high purity by substituting the metal on the cathode substrate 10 to noble metal, includes coiled nano carbon materials 21 and other types of nano carbon materials 22. The coiled carbon material 21 is a mix of coiled carbon nano tubes 211 and coiled carbon nano fibers 212, the measured quantity of the coiled nano carbon material 21 of the composited nano carbon material layer 20 is at least, in average, 60%; that is, the average measured quantity in the composited nano carbon material layer 20 satisfies:

$$\frac{C_{Coil-CNT} + C_{coil-CNF}}{C_T} \geq 60\%$$

Different concentration of the noble metal catalyst 31 causes different average diameter of the grown coiled nano carbon material 21, for instance, a concentration of 400~800 ppm of the noble metal catalyst 31 forms the coiled nano carbon material 21 with a outer diameter of 110.9±23.9 (nm), whereas a concentration of 800~1500 ppm of the noble metal catalyst 31 forms the coiled nano carbon material 21 with a diameter of 154.4=01.4 (nm); different specifications of the coiled nano carbon material 21 can be acquired by adjusting operation condition based on different purpose.

Figure 4:
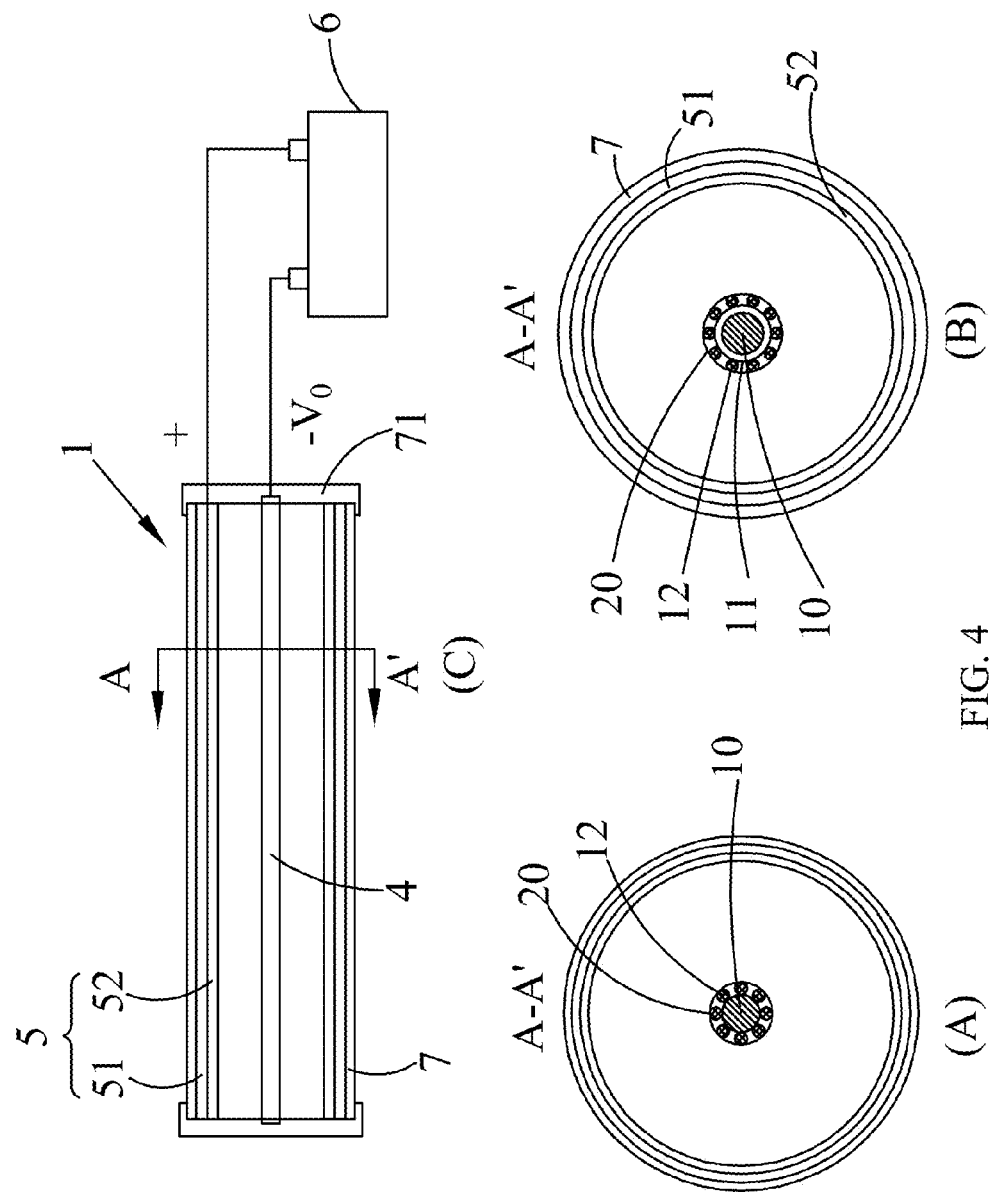
FIGS. 4A-4C are schematic diagrams illustrating a structure of the field emission cathode associated in a field emission lighting source of the present disclosure with FIG. 4A being a cross section taken along line A-A' of FIG. 4C and FIG. 4B being a modified form of FIG. 4A.

FIG. 4C is a schematic diagram illustrating a structure of the field emission cathode 4 associated in a field emission lighting source 1 of the present disclosure, which illustrating with a tube-like field emission lighting source 1, the structure of other type such as bulb-like of the field emission lighting source 1 is similar to the tube-like one, and thus the figure illustrating thereof is hereby omitted. The field emission anode 5 is composed of an anode substrate 51 and phosphor 52, in which the anode substrate 51 is covered by a layer of phosphor 52. The anode cathode 51 can be, but should not be limited to an indium tin oxide (ITO) glass substrate. The cathode substrate of the field emission cathode 4 can be a metal filament-like substrate, a metal-mesh like substrate and a metal membrane-like substrate, etc. In the following embodiments, the indium tin oxide glass substrate and the aluminum substrate are used for better understanding and explanation; the scope of the invention should not be limited to these. In which the indium tin oxide glass substrate is formed by disposing a layer of indium tin oxide on a glass substrate, and the aluminum substrate is formed by spray coating a layer of aluminum on a glass substrate. By utilizing the indium tin oxide glass substrate or the aluminum substrate, the electrons collided to the phosphor 52 can be introduced to a electric circuit.

The field emission anode 5 can be fabricated by, but should not be limited to the following two processes, such as:

1. While the field emission anode 5 is used in a tube-shaped transmissive vacuum envelope (e.g. a glass envelope 7 of tube shape), an indium tin oxide layer is disposed on the inner surface of the glass envelope 7 then forms the indium tin oxide glass substrate. The thickness of the indium tin oxide of the indium tin oxide glass substrate is about 1800 Å, and the sheet resistance value is 7.5 Ω/□cm; the indium tin oxide glass substrate is then covered by a layer of P22 phosphor slurry, and is placed into an oven and is baked in 350° C. for 30 min; the P22 phosphor slurry is made by mixing P22 phosphor in a macromolecular slurry. While the baking temperature reaches 300° C., the macromolecular agent begins to be evaporated, and the P22 phosphor 52 is remained and fixed on the indium tin oxide glass substrate, thereby forming the field emission anode 5.

2. While the field emission anode 5 is used in a bulb-shaped light transmissive vacuum envelope (e.g. a glass envelope 7 of bulb shape), an indium tin oxide layer is disposed on the inner surface of the glass bulb in the glass envelope 7 and forms an indium tin oxide glass substrate. The thickness of the indium tin oxide of the indium tin oxide glass substrate is about 1800 Å, and the sheet resistance value is 7.5 Ω/□cm. Alternatively, the inner side of the glass bulb can be spray coating with a layer of aluminum to form a aluminum substrate; the indium tin oxide glass substrate (or aluminum substrate) is then covered by a layer of P22 phosphor slurry, and is placed into an oven and is baked in 350° C. for 30 min; the P22 phosphor slurry is made by mixing P22 phosphor in a macromolecular slurry. While the baking temperature reaches 300° C., the macromolecular ahent begins to be evaporated, and the P22 phosphor is remained and fixed on the indium tin oxide glass substrate (or the aluminum substrate), thereby forming the field emission anode 5.

Referring to a cross-sectional view A-A' of FIG. 4C, FIG. 4A shows the field emission cathode 4 is composed of the cathode substrate 10 and the composited nano carbon layer 20, when the cathode substrate 10 is made of an electrically conductive metal (see FIG. 4A), the noble metal catalyst crystalline nucleus layer 12 is covered on the cathode substrate 10 before the composited nano carbon material layer 20 is grown. When the cathode substrate 10 is not made of an electrically conductive metal, the metal conductive layer 11 is covered on the cathode substrate 10 first (see FIG. 4B), then the metal conductive layer 11 is covered by the noble metal catalyst crystalline nucleus layer 12, and then the composited nano carbon material layer 20 may be grown.

The field emission cathode 4 and the field emission anode 5 are packed in a vacuum transparent glass envelope 7 sealed with an end cap 71. According to the vacuum transparent glass envelope 7 of the transparent glass tube sealed with an end cap 71, which includes the field emission cathode 4 and the field emission anode 5 packed therein (see FIG. 4C), a degree of vacuum is performed above $1.0 \times 10^{-5}$ torr for assembly the tube-shaped field emission lighting source 1; alternatively, the vacuum transparent glass envelope 7 of the transparent glass bulb can be sealed with an end cap 71, which includes the field emission cathode 4 and the field emission anode 5 packed therein, and a degree of vacuum is then performed above $1.0 \times 10^{-5}$ torr for assembly a bulb-shaped field emission lighting source 1. A first output (negative output) of the power supply 6 is connected to the field emission cathode 4, and a second output (positive output) is connected to the field emission anode 5, and by supplying a DC voltage of about $-5$ kV~$-10$ kV by the power supply 6, an electric field may be formed between the field emission cathode 4 and the field emission anode 5. While the voltage exceeds a turn-on voltage of the field emission cathode 4, electrons can be emitted from the field emission cathode 4, and light can be emitted when the electron beam is collided to the P22 phosphor 52 of the field emission anode 5, thereby forming a lighting source (see FIG. 9 and FIG. 10).

Based on different applications and purposes, an adjustable alternating root mean square voltage of $-5$ kV~$-10$ kV (AC) can be supplied by the power supply 6, the time period is represented as T, and a time period of which the electric potential of the first output exceeds $-4.0$ kV in a full time period is represented as Te, where, preferably, Te/T>10%. During every half time period (negative output lower than 0 V), if the absolute value of the voltage in the half time period is greater than the field emission turn-on voltage Vc, electrons can be emitted from the field emission cathode 4, and light can be emitted.

Based on different applications and purposes, a high-voltage pulse of $-5$ kV~$-10$ kV (DC) can be supplied by the power supply 6, the time period is represented as T, and a time period of which the electric potential of the first output exceeds $-4.0$ kV in a full time period is represented as Te, where, preferably, Te/T>10%. If the high-voltage pulse is adjustable, a ratio of adjustable pulse loading/non-loading can be 10%~90%; electrons can be emitted from the field emission cathode 4, and the phosphor 52 of the field emission anode 5 can be rested during the discharging time period, thereby extending the working life of the phosphor 52.

The following 5 embodiments is to illustrate and compare the field emission cathode 4 fabricated using different material of the cathode substrate 10, different noble metal catalyst 31, and different operation condition. The SEM or the TEM topology of the coiled nano carbon material 21 of the field emission cathode 4, J-E field emission characteristics, the field emission turn-on voltage Vc, and the field emission lighting source 1 assembly including the field emission cathode 4, are illustrated among these embodiments. For the purpose of better understanding and comparison, DC voltage is chosen to be used as the output of the power supply 6 in these embodiments, The First Embodiment In the present embodiment, the method for fabricating field emission cathode 4 of the present disclosure utilizing different predetermined growth temperature Tk is performed. The material of the cathode substrate 10 utilized in the present embodiment is majorly made of iron-cobalt-nickel alloy (#304 stainless steel) metal filament. The metal filament is first cleaned by physical sand blasting, then a metal conductive layer 11 is electroless plated on the metal filament. The metal conductive layer 11 of the cathode substrate 10 is washed, cleaned, and rinsed with acetone and water, and then dried (refer to step S1). The electroless plated metal filament (cathode substrate 10) is subsequently immersed in the noble metal catalyst solution 30 for 20 min (refer to step S2), where a compound of palladium chelated copolymer of styrene monomer and N-isopropylacrylamide monomer (Pd(styrenea-co-NIPAAmb)) is used as the organic chelated noble metal catalyst 31 of the noble metal catalyst solution 30. Next, the electroless plated metal filaments (cathode substrate 10) is placed in the atmosphere chamber for drying, the remained moistures are removed by blow dry with nitrogen So far the metal filaments having the noble metal catalyst crystalline nucleus layer 12 formed thereon is fabricated.

Figure 11:
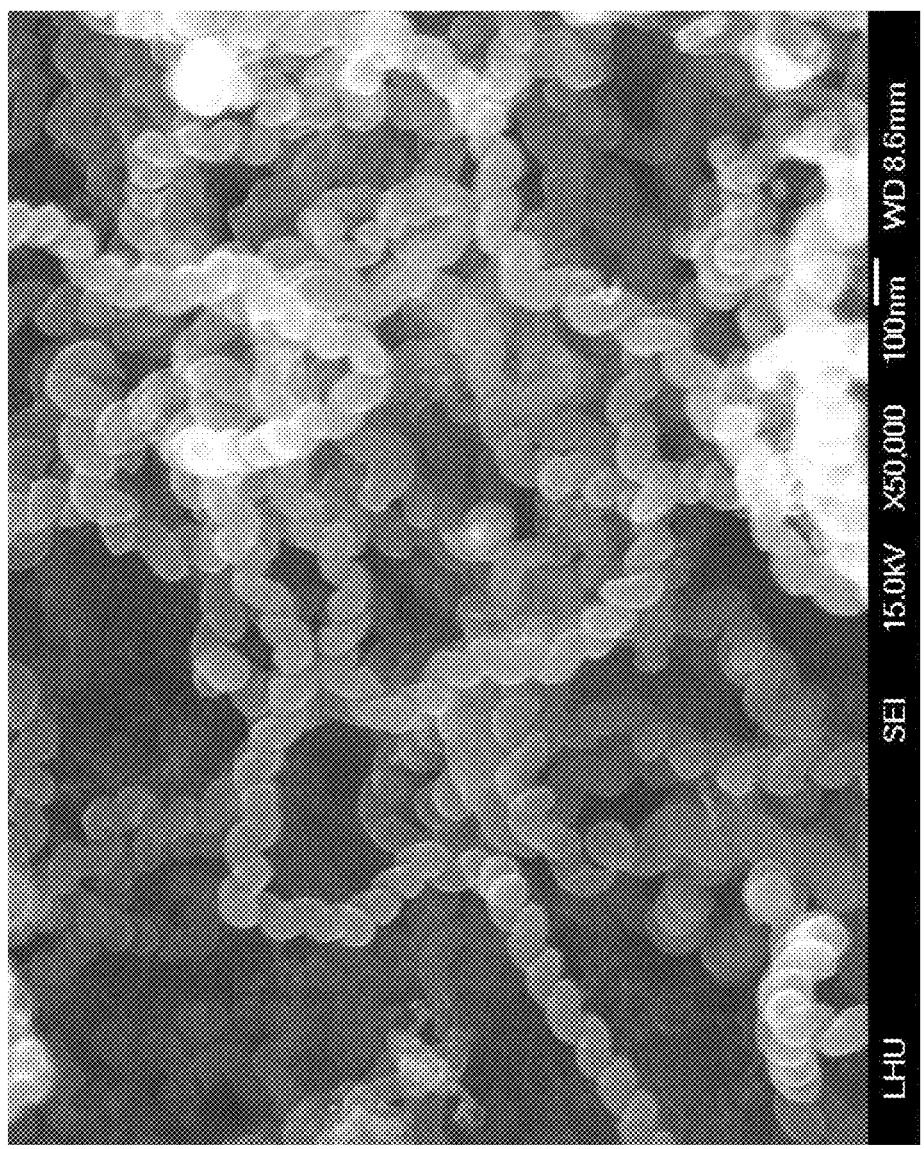
FIG. 11 is an SEM image of the composited nano carbon material layer 20 of the first embodiment according to the present disclosure, where the predetermined growth temperature Tk is (a) 500° C., (b) 550° C., (c) 600° C.
Figure 12:
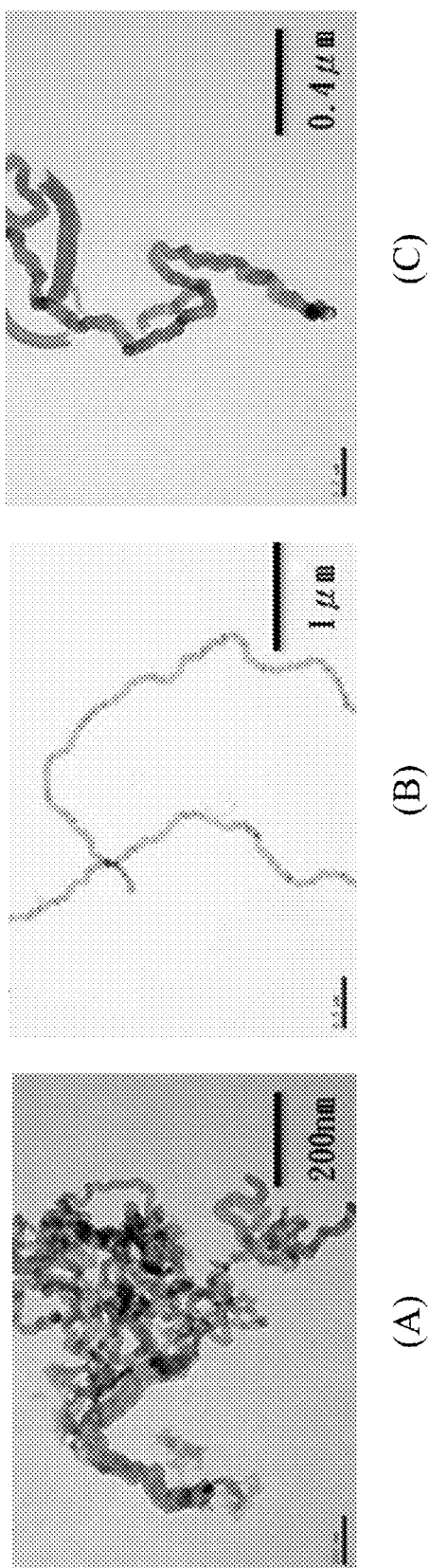
FIGS. 12A-12C are TEM images of the coiled carbon nano tube of the first embodiment according to the present disclosure, where the predetermined growth temperature Tk is (a) 500° C., (b) 550° C., (c) 600° C.

Afterwards, the metal filament having the noble metal catalyst crystalline nucleus layer 12 formed thereon is placed in a quartz tube and vacuumed with an initial vacuum having a degree of vacuum higher than a degree of vacuum of 0.1 torr. Then a mixed gas of acetylene and a mixed inert gas of argon and helium are introduced into the quartz tube. Then the TCVD method is performed, the predetermined growth temperature Tk is (a) 500° C., (b) 550° C., (c) 600° C., and the predetermined growing time is 20 min, to grow the composited nano carbon material layer 20 (refer to step S4). After cooling, the cathode substrate 10 having the composited nano carbon material layer 20 is drawn from the vacuum chamber (quartz tube) and the field emission cathode 4 is fabricated (refer to step S5). Wherein the composited nano carbon material layer 20 is a mix of coiled carbon nano tubes 211 and coiled carbon nano fibers 212. An SEM image of the composited nano carbon material layer 20 is shown in FIG. 11, and a TEM image thereof is shown in FIGS. 12A-12C. With the coiled nano carbon structure and the crystallized carbon nanoparticles, electrons can be emitted evenly from any parts of the coiled carbon nano tubes 211 and the coiled carbon nano fibers 212. So that the coiled carbon nano tubes 211 and the coiled carbon nano fibers 212 have excellent field emission characteristics. The measured quantity of the coiled nano material 21 is (a) 60%, (b) 70%, (c) 72%, respectively to the predetermined growth temperature Tk, where the measured quantity is the total quantity of nano carbon material of the composited nano carbon material layer counted by using a scanning electron microscope.

Figure 13A:
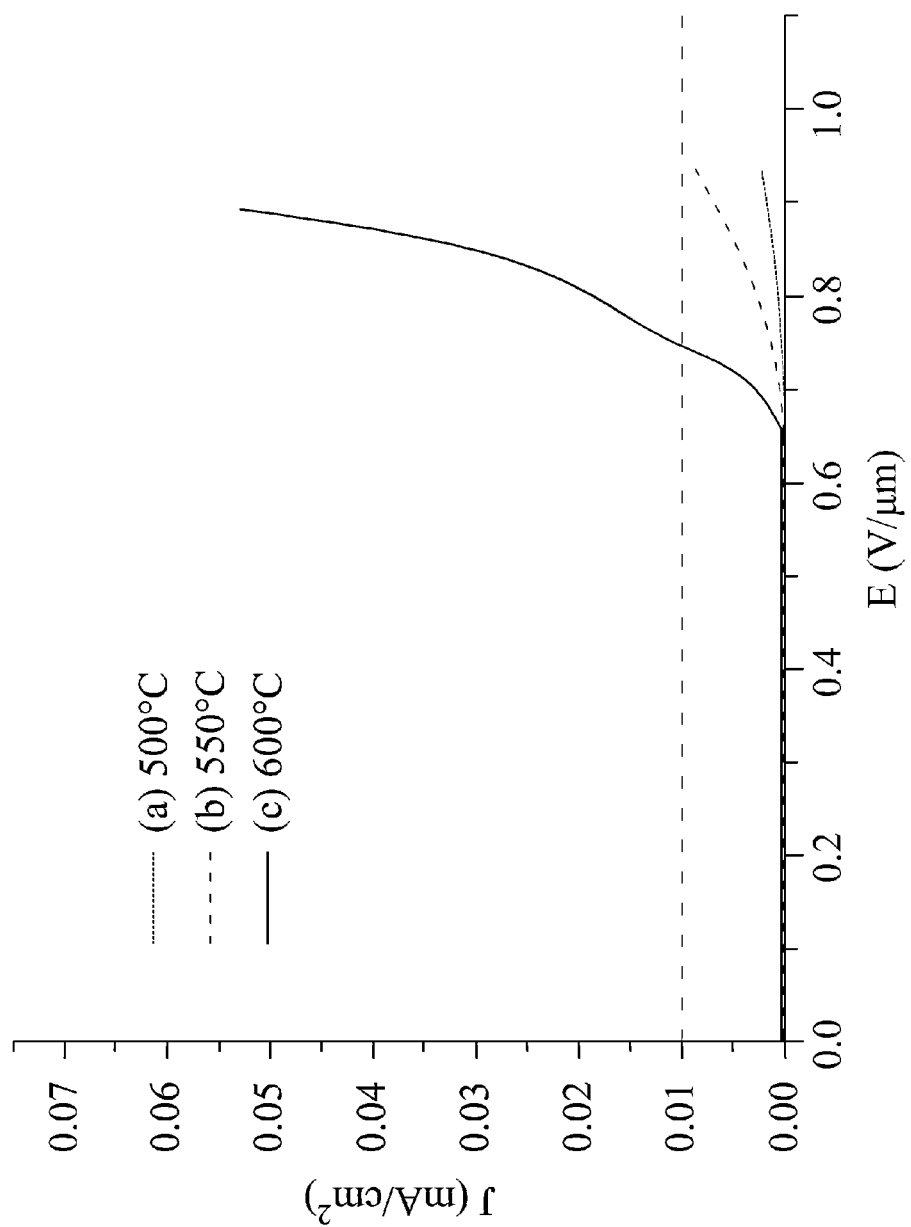
FIG. 13 is a J-E curve (A) and a current-voltage curve (B) of the first embodiment, the predetermined growth temperature Tk is (a) 500° C., (b) 550° C., (c) 600° C.

A J-E curve of further analysis of the filed emission characteristics of the field emission cathode 4 according to the present embodiment is shown in FIG. 13 (A). As shown in the figure, when an electric current J is 0.01 mA/cm$^2$, the intensities of the electric field is (a) E>1.0 V/μm, (b) E=0.9 V/μm, (c) E=0.75 V/μm, respectively to the predetermined growth temperature Tk, which all satisfy the field emission turn-on electric field of Ec≥0.7 V/μm. In which, the J-E curve is acquired with a condition of the interval between the field emission cathode 4 and the field emission anode 5 is 7500 μm, and the area of the field emission anode is 10 cm$^2$; these conditions are the same in the followings.

Figure 13B:
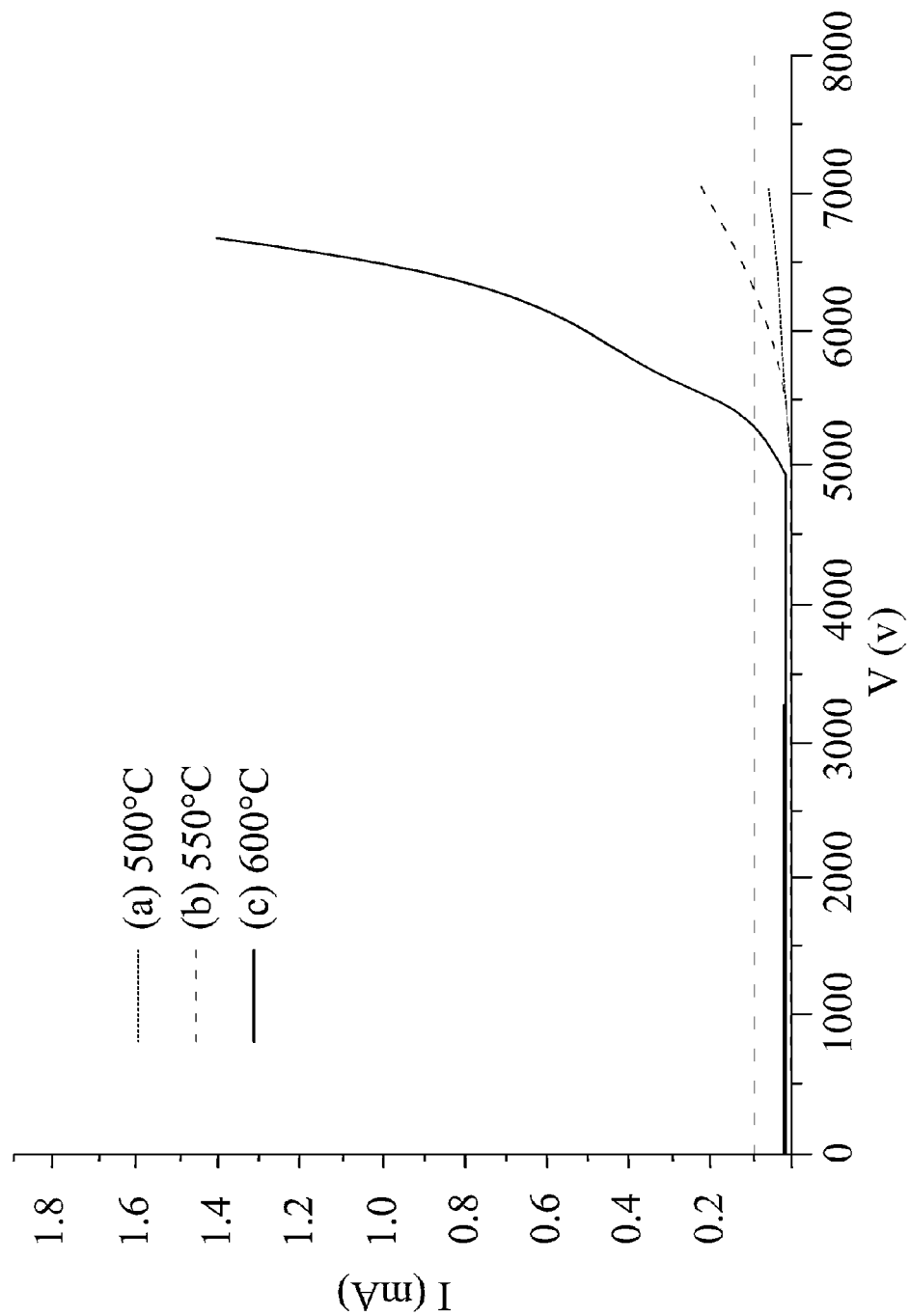

The field emission cathode 4 is assembled for providing as a field emission electric field, and the current-voltage curve is shown in FIG. 13 (B). As shown in the figure, while the current I is 0.1 mA, the voltage of the electric field is (a) V>7 kV' (b) V=6.5 kV' (c) V=5.2 kV, respectively to the predetermined growth temperature Tk, which all satisfy the field emission turn-on voltage of Vc≥−4.0 kV. Note that, the X-axis (V(v)) in FIG. 13(B), FIG. 14(B), FIG. 16, FIG. 17 is taking the positive value of the voltage of the electric field in drawing convenience, same as the followings.

Figure 9:
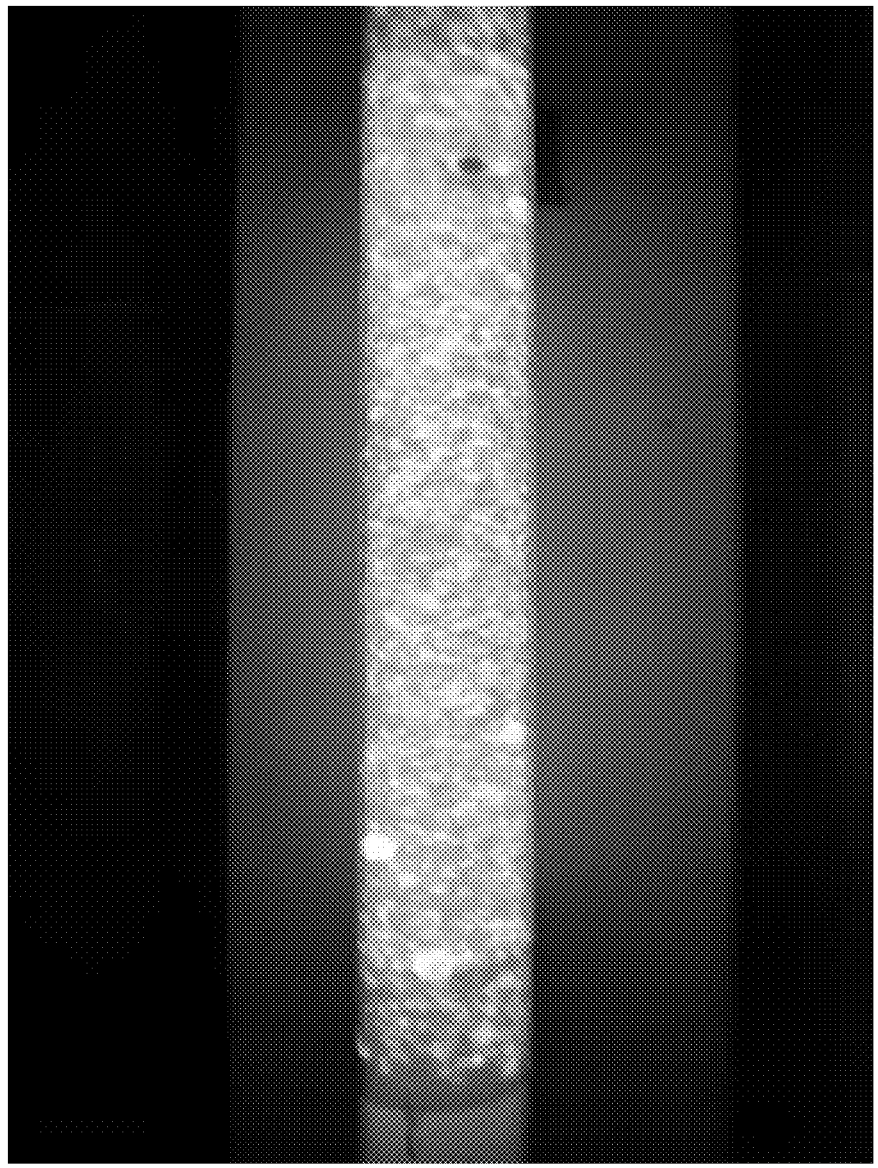
FIG. 9 is a photograph of lighting of the field emission lighting tube of an example according to the present disclosure.

The field emission cathode 4 is further assembly to a tube-like field emission lighting source 1 driven by a DC voltage of −6 kV and 1.0 mA supplied by the power supply 6, and a photograph of lighting thereof is shown in FIG. 9.

The field emission cathode 4 of the present disclosure provides higher field emission turn-on voltage, more even electron beams, and thus overcoming numerous disadvantages of field emission lighting sources of prior arts such as the unevenness of lighting and the limitation of enhancement of the luminance.

The Second Embodiment

In the present embodiment, the method for fabricating field emission cathode 4 of the present disclosure utilizing different predetermined growing time is performed. The material of the cathode substrate 10 utilized in the present embodiment is majorly made of iron-cobalt-nickel alloy (#304 stainless steel) metal filaments, where the cathode substrate 10 is first cleaned by physical sand blasting, and then a metal conductive layer 11 with nickel is electroless plated on the metal filaments; the metal conductive layer 11 is washed, cleaned, and rinsed with acetone and water, and then dried (refer to step S1). The nickel plated metal filaments (cathode substrate 10) is subsequently immersed in the noble metal catalyst solution 30 for 20 min (refer to step S2), where a compound of palladium chelated copolymer of styrene monomer and N-isopropylacrylamide monomer (Pd(styrenea-co-NIPAAmb)) is used as the organic chelated noble metal catalyst 31 of the noble metal catalyst solution 30. Next, the nickel plated metal filaments (cathode substrate 10) is placed in the atmosphere chamber and dried in 100° C. then blowed dry with nitrogen to remove the remained moisture. So far the metal filament having the noble metal catalyst crystalline nucleus layer 12 formed thereon is fabricated.

Afterwards, the metal filament having the noble metal catalyst crystalline nucleus layer 12 formed thereon is placed in a quartz tube and vacuumed with an initial vacuum having a degree of vacuum higher than a degree of vacuum of 0.1 torr, and then a mixed gas of acetylene and an mixed inert gas of argon and hydrogen are introduced into the quartz tube. Then, the TCVD method is processed, the predetermined growing time is (a) 5 min, (b) 20 min, (c) 30 min, and the predetermined growth temperature Tk is 600° C. (refer to step S4). After cooling, the cathode substrate 10 having the composited nano carbon material layer 20 is drawn from the vacuum chamber (quartz tube) for fabricating the field emission cathode 4 (refer to step S5). The measured quantity of the coiled nano material 21 is (a) 80%, (b) 72%, (c) 65%, respectively to the predetermined growing time.

Figure 14A:
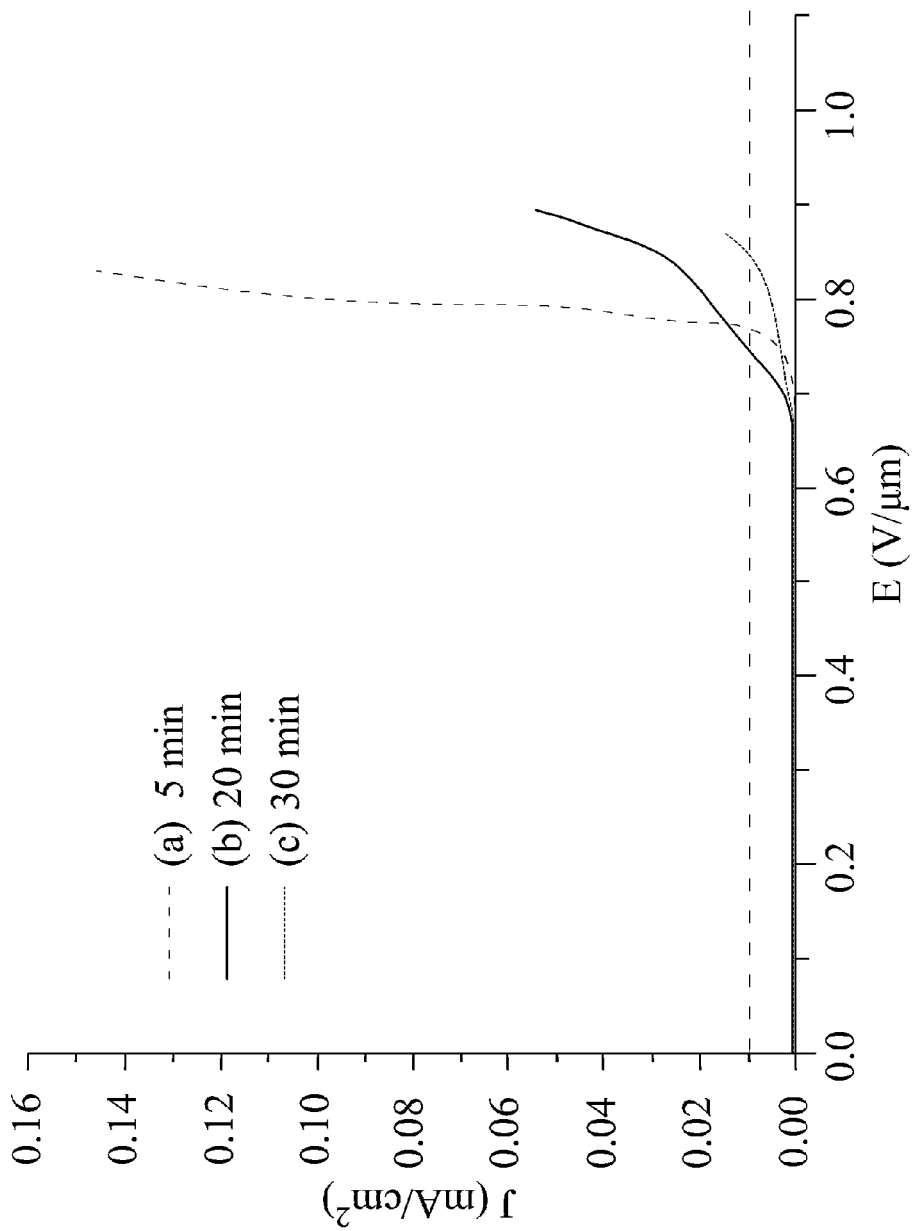
FIG. 14 is a J-E curve (A) and a current-voltage curve (B) of the second embodiment, where the predetermined growing time is (a) 5 min, (b) 20 min, (c) 30 min.
Figure 14B:
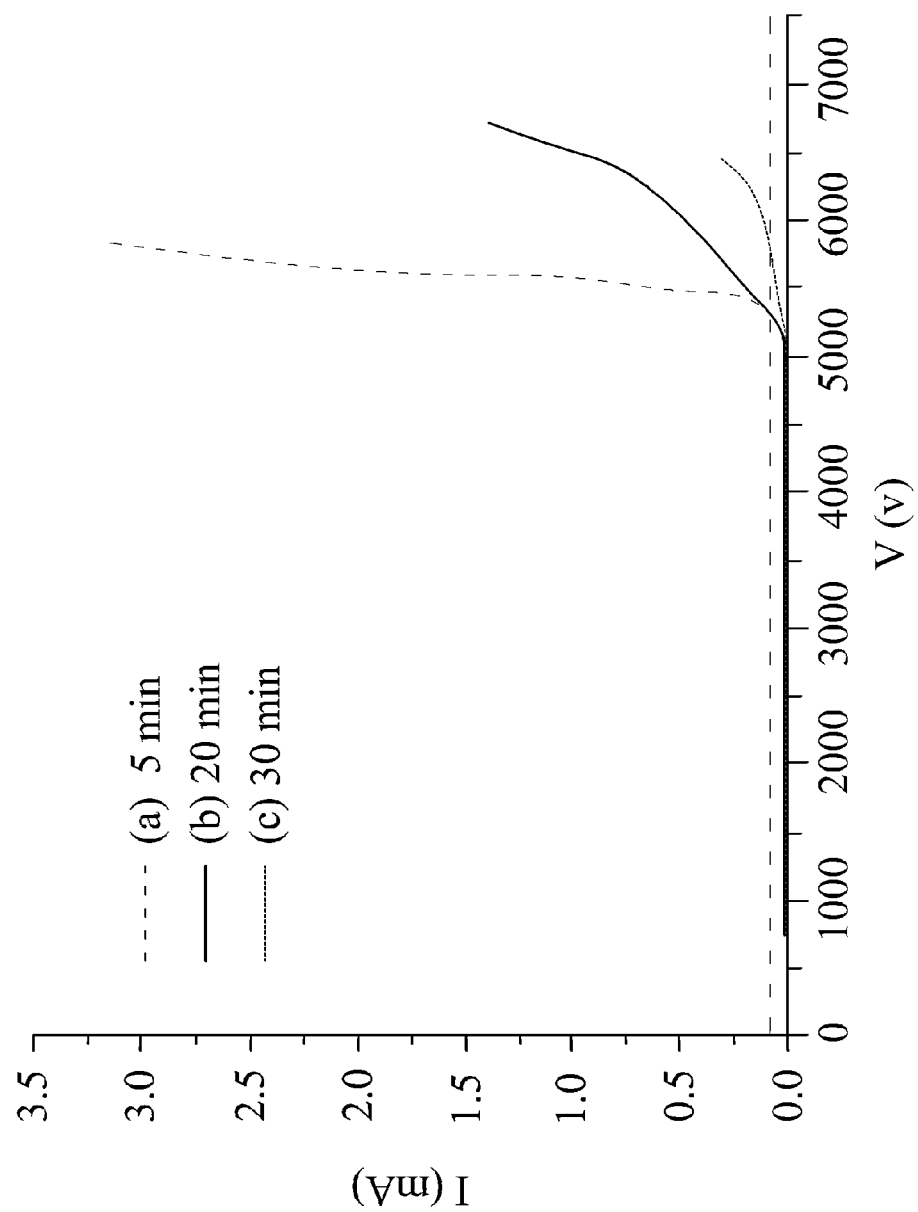

A J-E curve of further analysis of the filed emission characteristics of the field emission cathode 4 according to the present embodiment is shown in FIG. 14 (A). As shown in the figure, when an electric current J is 0.01 mA/cm$^2$, the intensities of the electric field is (a) E=0.85 V/μm, (b) E=0.78 V/μm, (c) E=0.8 V/μm, respectively to the predetermined growing time, which all satisfy the field emission turn-on electric field of Ec≥0.7 V/μm.

The field emission cathode 4 is assembled for providing as a field emission electric field, and the current-voltage curve is shown in FIG. 14 (B). As shown in the figure, while the current I is 0.1 mA, the voltage of the electric field is (a) V=6.3 kV' (b) V=5.2 kV' (c) V=6.7 kV, respectively to the predetermined growing time, which all satisfy the field emission turn-on voltage of Vc≥−4.0 kV.

The Third Embodiment

In the present embodiment, the method for fabricating field emission cathode 4 of the present disclosure utilizing different predetermined growth temperature Tk is performed. The material of the cathode substrate 10 utilized in the present embodiment is majorly made of iron-cobalt-nickel alloy (#304 stainless steel) metal filaments, where the cathode substrate 10 is first immersed in 10% HCl for 30 seconds, following by washing with water, and then dried (refer to step S1); the metal filament (cathode substrate 10) is subsequently immersed in the noble metal catalyst solution 30 for 30 min to 60 min (refer to step S2), where $PdCl_2$ is used as the noble metal catalyst 31 of the noble metal catalyst solution 30, and the concentration of the $PdCl_2$ is ranged from 300 ppm to 1500 ppm, which depends on the metal filament immersing time. Next, the metal filaments (cathode substrate 10) is placed in the atmosphere chamber and dried in 100° C., the remained moisture is removed by blow dry with nitrogen. The metal filament having the noble metal catalyst crystalline nucleus layer 12 formed thereon is fabricated.

Figure 15:
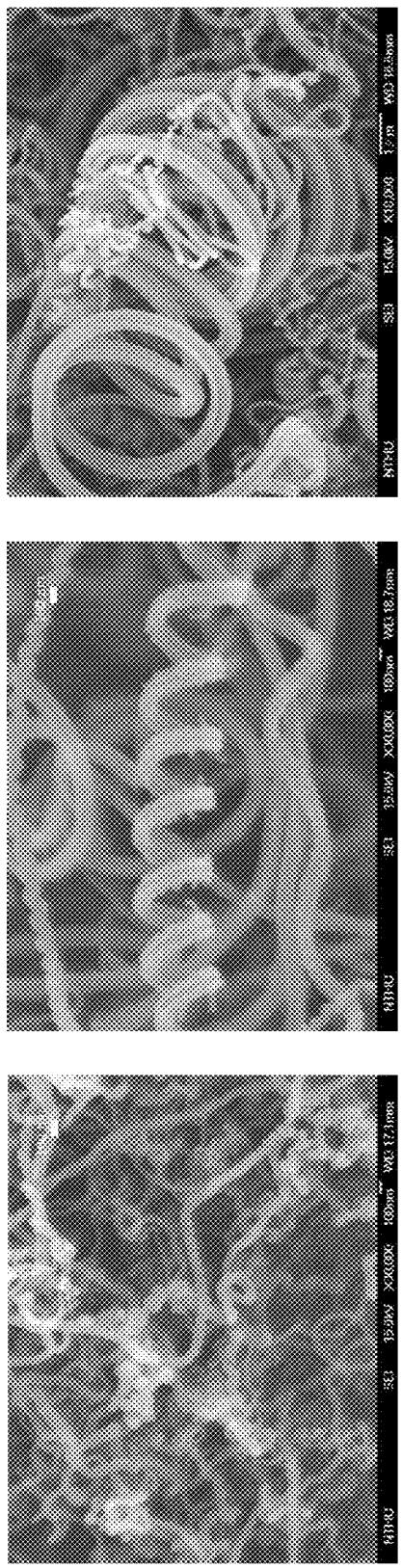
FIGS. 15A-15C are SEM images of the coiled carbon nanocoil of the third embodiment according to the present disclosure, where the predetermined growth temperature Tk is (a) 600° C., (b) 700° C., (c) 800° C.

Afterwards, the metal filaments having the noble metal catalyst crystalline nucleus layer 12 formed thereon are placed in a quartz tube and vacuumed with an initial vacuum having degree of vacuum higher than a degree of vacuum of 0.1 torr, and then a mixed gas of acetylene and an mixed inert gas of argon and hydrogen are introduced into the quartz tube. Then, the TCVD method is processed, the predetermined growth temperature is (a) 600° C., (b) 700° C., (c) 800° C., and the predetermined growing time is 20 min (refer to step S4). After cooling, the cathode substrate 10 having the composited nano carbon material layer 20 is produced from the vacuum chamber (quartz tube) for further fabricating the field emission cathode 4 (refer to step S5). An SEM image of the composited nano carbon material layer 20 is shown in FIGS. 15A-15C. The measured quantity of the coiled nano material 21 is 80% in FIG. 15A, 72% in FIG. 15B, and 65% in FIG. 15C, respectively to the predetermined growth temperature.

The field emission cathode 4 having the composited nano carbon material layer 20 formed thereon is displaced in the atmosphere chamber, and then nitrogen gas is introduced therein. Next, the atmosphere chamber is heated to the predetermined post-processing temperature Tc=300° C. for performing the post-processing step (refer to step S6). The measured quantity of the coiled nano material 21 is (a) 92%, (b) 88%, (c) 96%, respectively to the predetermined growth temperature.

Figure 16:
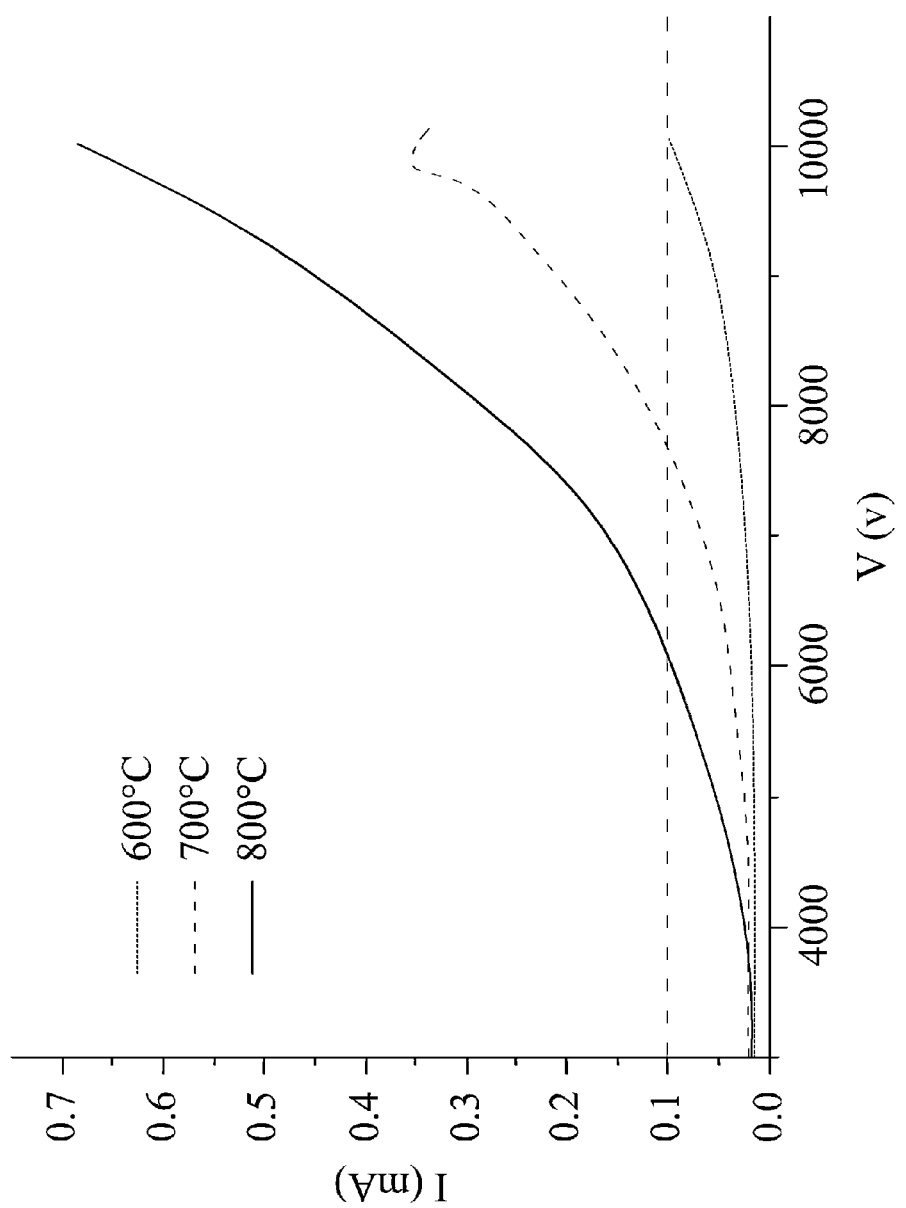
FIG. 16 is a current-voltage curve of the third embodiment according to the present disclosure, where the predetermined growth temperature Tk is (a) 600° C., (b) 700° C., (c) 800° C.

The field emission cathode 4 is assembled for providing as a field emission electric field, and the current-voltage curve is shown in FIG. 16. As shown in the figure, while the current I is 0.1 mA, the voltage of the electric field is (a) V=10 kV、 (b) V=8.0 kV、 (c) V=5.7 kV, respectively to the predetermined growth temperature, which all satisfy the field emission turn-on voltage of Vc≥−4.0 kV.

Figure 10:
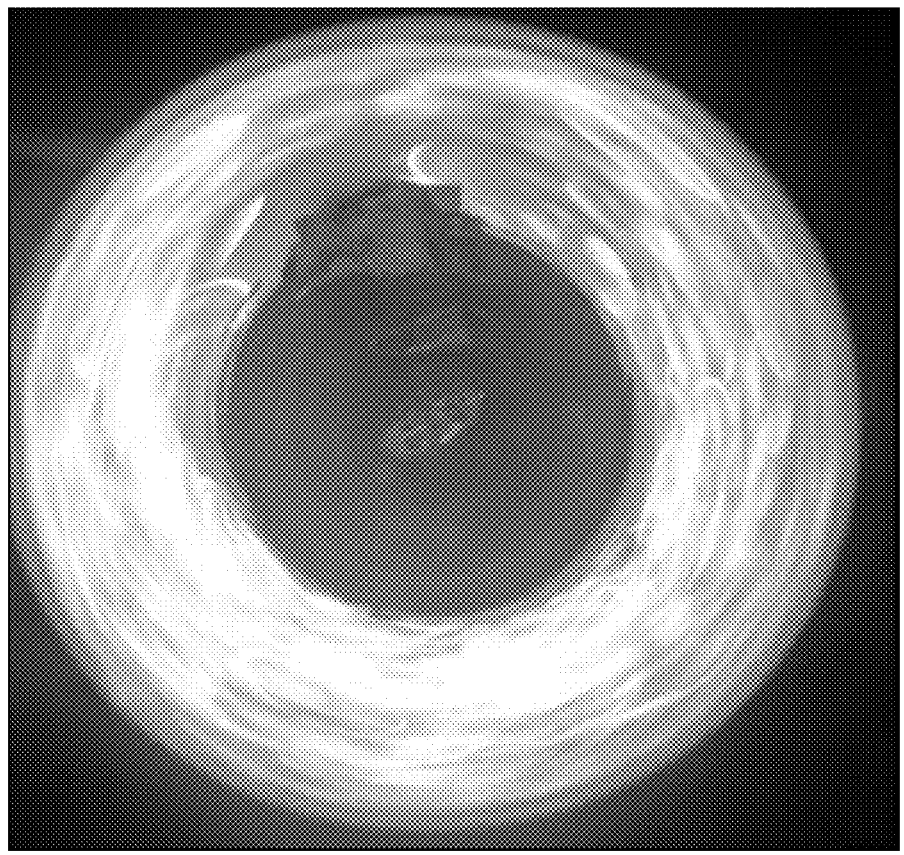
FIG. 10 is a photograph of lighting of the field emission lighting bulb of an example according to the present disclosure.

The field emission cathode 4 is further fabricated to a bulb-like field emission lighting source 1 driven by a DC voltage of −6 kV and 1.0 mA supplied by the power supply 6, and a photograph of lighting thereof is shown in FIG. 10.

The field emission cathode 4 of the present disclosure provides higher field emission turn-on voltage, more even electron beams, and thus overcoming numerous disadvantages of field emission lighting sources of prior arts such as the unevenness of lighting, and the limitation of enhancement of the luminance.

The Fourth Embodiment

In the present embodiment, the method for fabricating field emission cathode 4 of the present disclosure utilizing different predetermined post-processing temperature Tc is performed. The material of the cathode substrate 10 utilized in the present embodiment is as same as the second embodiment, where Pd(styrenea-co-NIPAAmb) is used as the organic chelated noble metal catalyst 31 of the noble metal catalyst solution 30. Then, the TCVD process is performed, the predetermined growth temperature Tk is 600° C., and the predetermined growing time is 20 min. The measured quantity of the coiled nano material 21 is 70%, where the measured quantity is the total quantity of nano carbon material of the composited nano carbon material layer counted by using a scanning electron microscope.

The field emission cathode 4 having the composited nano carbon material layer 20 formed thereon is displaced in the atmosphere chamber, and then nitrogen gas is introduced therein. Next, the atmosphere chamber is heated to the predetermined post-processing temperature Tc, where Te is (a) 200° C., (b) 300° C., (c) 400° C. for performing the post-processing step (refer to step S6). The measured quantity of the coiled nano material 21 is (a) 69%, (b) 72%, (c) 75%, respectively to the predetermined post-processing temperature Tc.

Figure 17:
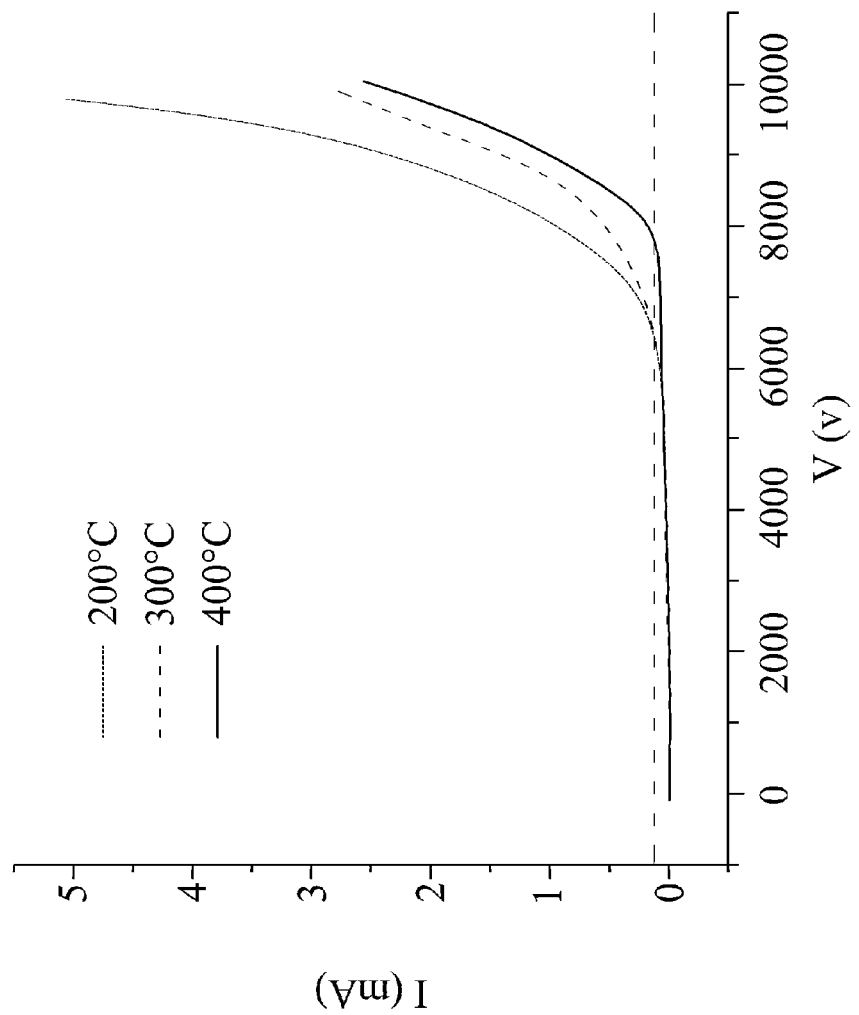
FIG. 17 is a current-voltage curve of the fourth embodiment according to the present disclosure, where the predetermined growth temperature Tk is (a) 200° C., (b) 300° C., (c) 400° C.

The field emission cathode 4 is assembled for providing as a field emission electric field, and the current-voltage curve is shown in FIG. 17. As shown in the figure, while the current I is 0.1 mA, the voltage of the electric field is (a) V=10 kV、 (b) V=8.3 kV、 (c) V=9.1 kV, respectively to the predetermined post-processing temperature Tc, which all satisfy the field emission turn-on voltage of Vc≥−4.0 kV.

The Fifth Embodiment

In the present embodiment, the method for fabricating field emission cathode 4 of the present disclosure is performed, where the cathode substrate 10 is made of glass and is chemical electroless plated with Ni—P, in order to from a metal conductive layer 11 on the surface of the cathode substrate 10. The bar-like glass cathode substrate 10 with a length of 12 cm and a thickness of 3 mm is cleaned by degreasing, roughened by physical sand blasting, and then dried in 90° C.; an average roughness (Ra) thereof is about 5~35 μm. Next, the cleaned glass cathode substrate 10 is roll brushed with electric conductive slurry, and so that a layer of electric conductive slurry can be formed on the surface of the glass cathode substrate 10. In which the electric conductive slurry is composed with a water glass and a graphite, that the water glass is molarity 52 mol/L and the graphite is 25% w/t. Then, the glass cathode substrate 10 is then plated with a Ni—P alloy layer by electroless plating, thereby forming the metal conductive layer 11.

The noble metal catalyst for the cathode substrate 10 utilized in the present embodiment is as same as the second embodiment, where Pd(styrenea-co-NIPAAmb) is used as the organic chelated noble metal catalyst 31 of the noble metal catalyst solution 30. Then, the TCVD process is performed, the predetermined growth temperature Tk is (a) 500° C., (b) 700° C., and the predetermined growing time is 20 min. The measured quantity of the coiled nano material 21 is (a) 46%, (b) 53%, respectively to the predetermined growth temperature Tk, where the measured quantity is the total quantity of nano carbon material of the composited nano carbon material layer counted by using a scanning electron microscope.

Figure 18:
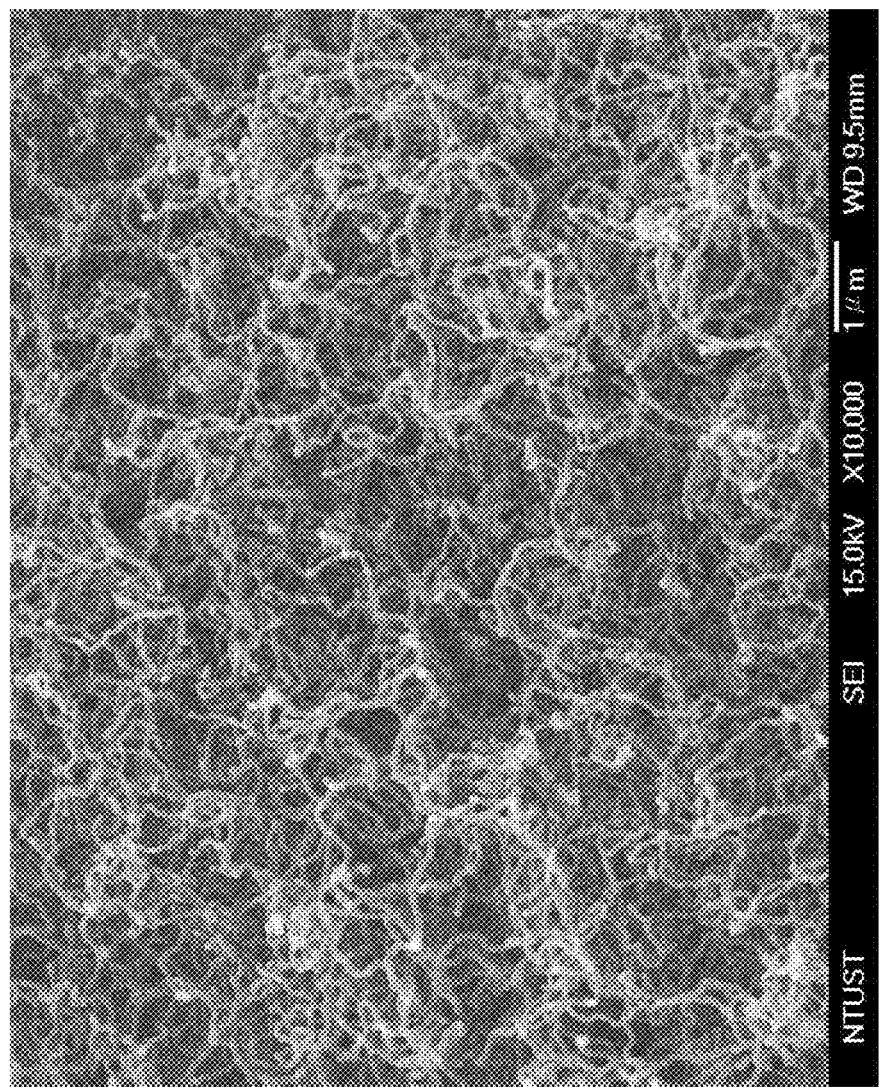
FIG. 18 is an SEM image of the coiled carbon nano tube of the fifth embodiment according to the present disclosure.
Figure 19:
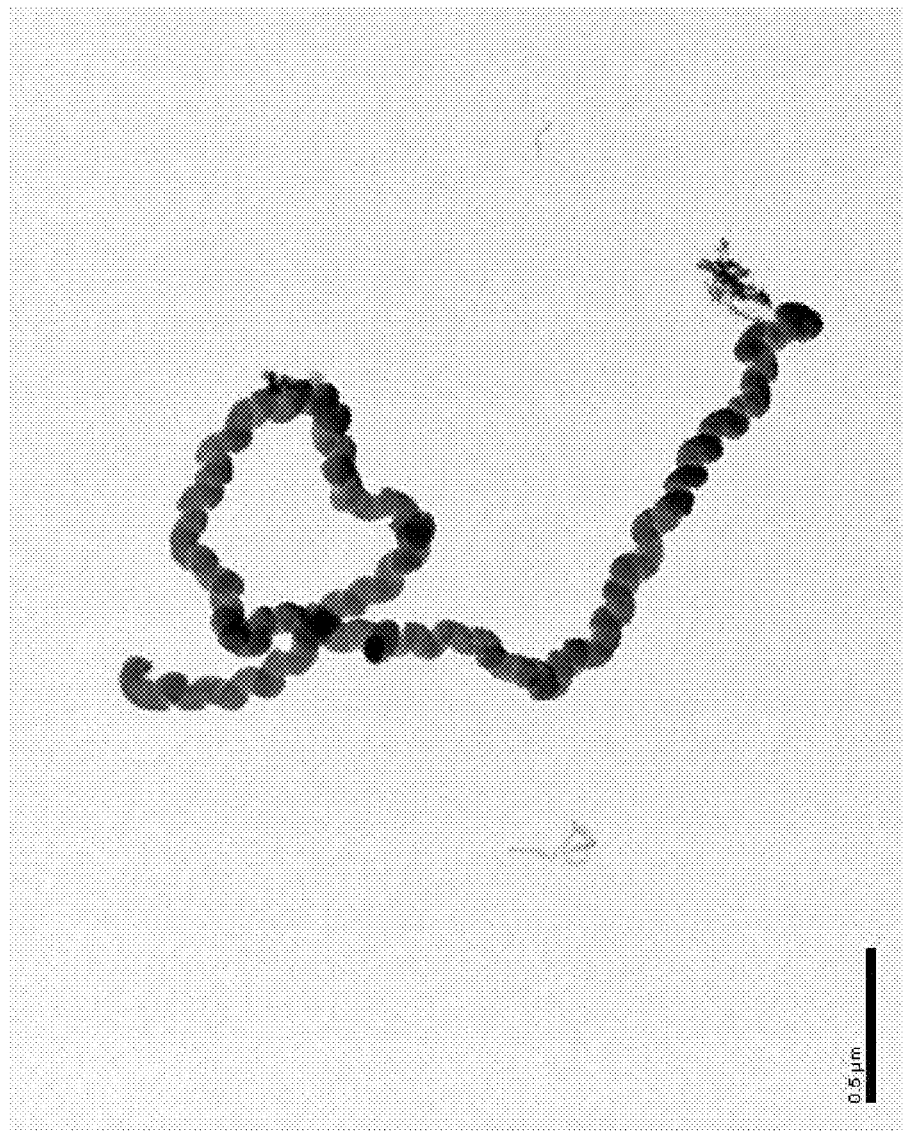
FIG. 19 is a TEM image of the coiled carbon nano tube of the fifth embodiment according to the present disclosure.

An SEM image and TEM image of the composited nano carbon material layer 20 are shown in FIG. 18 and FIG. 19, respectively.

The field emission cathode 4 having the composited nano carbon material layer 20 formed thereon is displaced in the atmosphere chamber, and then nitrogen gas is introduced therein. Next, the atmosphere chamber is heated to the predetermined post-processing temperature Tc, where Tc is 300° C., for performing the post-processing step (refer to step S6). The measured quantity of the coiled nano material 21 is (a) 52%, (b) 58%, respectively to the predetermined growth temperature Tk.

Figure 20:
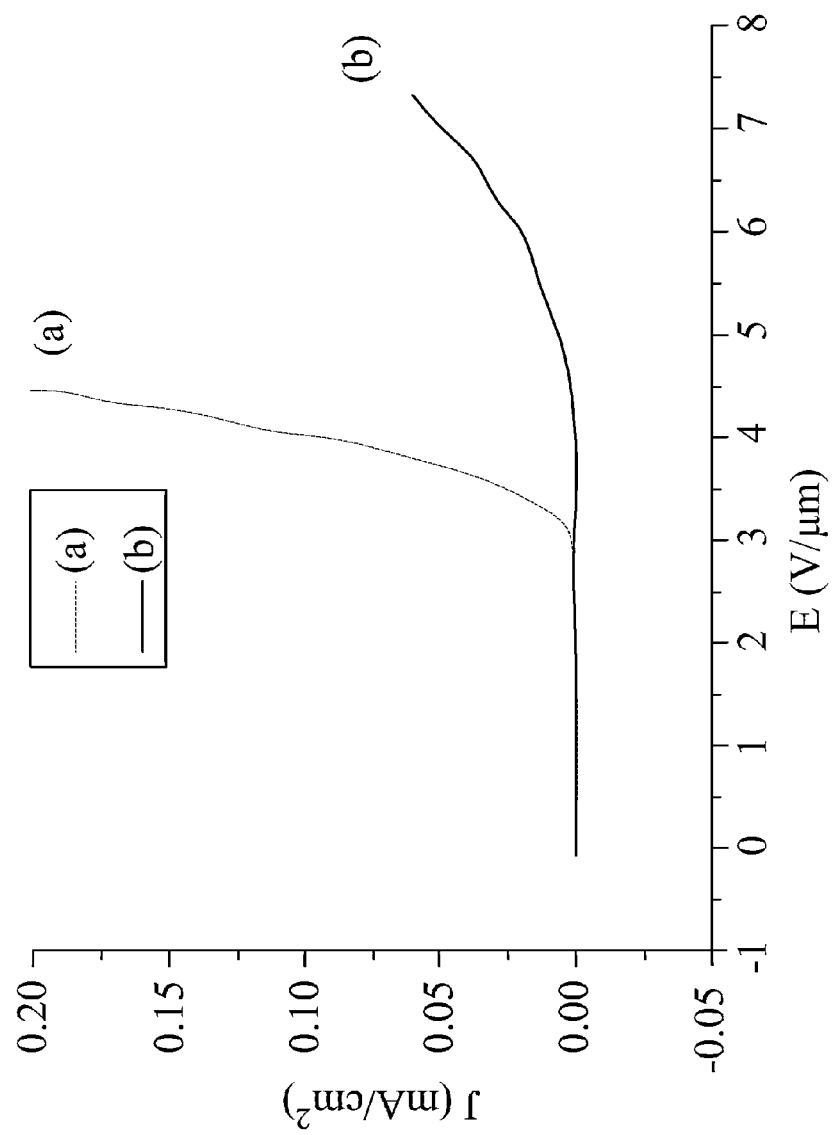
FIG. 20 is a J-E curve of the fifth embodiment according to the present disclosure, where the predetermined growth temperature Tk is (a) 500° C., (b) 700° C.

A J-E curve of further analysis of the filed emission characteristics of the field emission cathode 4 according to the present embodiment is shown in FIG. 20. As shown in the figure, when an electric current J is 0.01 mA/cm$^2$, the intensities of the electric field is (a) E=3.2 V/μm, (b) E=5 V/μm, respectively to the predetermined growth temperature Tk, which both satisfy the field emission turn-on electric field of Ec≥0.7 V/μm.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for fabricating a field emission cathode, comprising:
    providing a cathode substrate, wherein the surface of the cathode substrate comprises at least one metal conductive layer located thereon;
    immersing the cathode substrate in a noble metal catalyst solution containing a noble metal catalyst, and forming a noble metal catalyst crystallite nucleus layer on the metal conductive layer of the cathode substrate by self-assembly of the noble metal catalyst;
    drying the cathode substrate formed with the noble metal catalyst crystallite nucleus layer;
    performing thermal chemical vapor deposition (TCVD) process for fabricating a field emission cathode by disposing the cathode substrate formed with the noble metal catalyst crystallite nucleus layer in a vacuum chamber, introducing an inert gas and a carbon source gas into the vacuum chamber with an initial vacuum, heating the vacuum chamber to a predetermined growth temperature, and growing a composited nano carbon material layer on the cathode substrate with a predetermined growing time; and
    after cooling, withdrawing the field emission cathode from the vacuum chamber;
    wherein, the composited nano carbon material layer consists of a composited nano carbon material, and the composited nano carbon material comprises a coiled nano carbon material, the coiled nano carbon material is a mixture of a coiled carbon nano tube and a coiled carbon nano fiber;
    wherein, an average measured quantity of the coiled nano carbon material of the composited nano carbon material layer in a total of the composited nano carbon material is at least 40%,
    wherein the noble metal catalyst is selected from an organic chelate compound of platinum, palladium, rhodium, chrome, ruthenium, osmium, or iridium, and mixtures thereof, and the organic chelate is a copolymer of styrene monomer and N-isopropylacrylamide monomer (Poly(Styrenea-Co-NIPAAmb), or polystyrene oligomer.

2. The method according to claim 1, wherein the cathode substrate is made of metal material, indium tin oxide electroplated material, or combinations thereof.

3. The method according claim 1, wherein if the cathode substrate is an iron-nickel alloy substrate, an iron-cobalt-nickel alloy substrate, a nickel substrate, a nickel-copper substrate, a copper substrate, a copper alloy substrate, a silicon substrate electroplated or doped with nickel, a glass substrate electroplated or doped with nickel, a alumina ceramic substrate electroplated or doped with nickel, or combinations thereof, the noble metal catalyst is selected from a solution of chloride, sulfate, acetate, and mixtures compounded of platinum, palladium, rhodium, chrome, ruthenium, osmium, iridium, and mixtures thereof followed by the organic chelate.

4. The method according to claim 1, wherein the carbon source gas is acetylene, methane, or combinations thereof, and the inert gas is hydrogen, argon, helium, or combinations thereof.

5. The method according to claim 1, wherein the initial vacuum is higher than 0.1 torr, the predetermined growth temperature is 500° C.~900° C., and the predetermined growing time is 5 min~60 min.

6. The method according to claim 1, after withdrawing the field emission cathode from the vacuum chamber, further comprising a post-processing process comprising:
    disposing the field emission cathode in a controlled atmospheric chamber filled with inert gas, and heating the controlled atmospheric atmosphere chamber to a predetermined post-processing temperature;
    wherein the predetermined post-processing temperature is above 200° C.;
    wherein the average measured quantity of the coiled nano carbon material of the post-processed composited nano carbon material layer in the total composited nano carbon material is at least 44%.

7. A field emission cathode fabricated by the method according to claim 1, comprising from the inside to the outside:
    a cathode substrate and a composited nano carbon material layer, wherein the surface of the cathode substrate comprises at least one metal conductive layer located thereon;
    wherein the composited nano carbon material layer consists of a composited nano carbon material, and the composited nano carbon material comprises a coiled nano carbon material, the coiled nano carbon material is a mixture of a coiled carbon nano tube and a coiled carbon nano fiber;
    wherein an average measured quantity of the coiled nano carbon material of the composited nano carbon material layer in a total of the composited nano carbon material is at least 40%.

8. The field emission cathode according to claim 7, further satisfying the following condition:

$$Vc \leq -4.0\ kV$$

wherein Vc represents a field emission turn-on voltage of the field emission cathode, and is the voltage corresponding to an electric current being 0.1 mA in the electric field.

9. The field emission cathode according to claim 7, further satisfying the following condition:

$$0.7 \, V/\mu m \leq Ec$$

wherein Ec represents a turn-on electric field intensity of the field emission cathode which the turn-on electric field intensity is the lowest electric field intensity at an electric current density of 0.01 mA/cm$^2$ occurred in the electric field.

10. A field emission lighting source, comprising a field emission cathode, a field emission anode, and a power supply, the field emission cathode and the field emission anode are packaged in a light-transmissive vacuum envelope, whereby a light beam is emitted driven by a power provided by the power supply;
   wherein the field emission cathode is the field emission cathode according to claim 8;
   wherein the field emission anode comprises an anode substrate and a phosphor;
   wherein the anode substrate is a glass substrate, a glass substrate deposed with indium tin oxide, a metal substrate, or combinations thereof;
   wherein the power supply has a first output connected to the field emission cathode and a second output connected to the field emission anode.

* * * * *